(12) United States Patent
Smith et al.

(10) Patent No.: US 12,505,089 B1
(45) Date of Patent: Dec. 23, 2025

(54) SYSTEMS AND METHODS FOR HYDRATING AND MAINTAINING DATA INTEGRITY OF A DATA LAKE

(71) Applicant: Fannie Mae, Washington, DC (US)

(72) Inventors: Charles A. Smith, Washington, DC (US); Santanu Haldar, Washington, DC (US); Oliver Mathias, Washington, DC (US); Amit Mayabhate, Washington, DC (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 18/613,686

(22) Filed: Mar. 22, 2024

(51) Int. Cl.
*G06F 7/00* (2006.01)
*G06F 16/21* (2019.01)
*G06F 16/23* (2019.01)
*G06F 16/25* (2019.01)
*G06F 17/00* (2019.01)

(52) U.S. Cl.
CPC ........ *G06F 16/2365* (2019.01); *G06F 16/213* (2019.01); *G06F 16/2358* (2019.01); *G06F 16/258* (2019.01)

(58) Field of Classification Search
None
See application file for complete search history.

(56) References Cited

U.S. PATENT DOCUMENTS

| 12,001,416 | B1 * | 6/2024 | Cwalina | G06F 16/24564 |
| 2019/0377713 | A1 * | 12/2019 | Lankford | G06F 16/2379 |
| 2021/0201169 | A1 * | 7/2021 | Fung Moo | G06Q 40/08 |

* cited by examiner

*Primary Examiner* — Tuan A Pham
(74) *Attorney, Agent, or Firm* — Foley & Lardner LLP

(57) ABSTRACT

Disclosed are systems and methods for maintaining data integrity (e.g., of a database, a data lake, etc.). In some embodiments, one or more processing circuits identify an update, insertion, or deletion of unstructured data stored in an upstream source. The processing circuits determine a new schema of the unstructured data using an inferring function and further determine a divergence between the new schema and a previous schema of the unstructured data based on comparing the new schema to the previous schema of the unstructured data. In an example, the processing circuits store the structured data in a database. The database includes an established data channel between the database and a downstream source, and the structured data is a unique representation within the database of the update, insertion, or deletion of the unstructured data.

20 Claims, 8 Drawing Sheets

SYSTEMS AND METHODS FOR HYDRATING AND MAINTAINING DATA INTEGRITY OF A DATA LAKE

BACKGROUND

In data management and processing within networked environments such as the Internet, entities such as people or companies can store, access, and provide large amounts of unstructured, semi-structured, and structured data. These entities may desire to increase interoperability of the data by integrating the data into structured systems like databases and data lakes.

SUMMARY

Some embodiments relate to a method for maintaining data integrity, including identifying, by one or more processing circuits, an update, insertion, or deletion of unstructured data stored in an upstream source. The method further includes determining, by the one or more processing circuits, a new schema of the unstructured data using an inferring function. The method further includes determining, by the one or more processing circuits, a divergence between the new schema and a previous schema of the unstructured data based on comparing the new schema to the previous schema of the unstructured data. The method further includes generating, by the one or more processing circuits, structured data including one or more pointers to the unstructured data, wherein generating the structured data includes normalizing the unstructured data. The method further includes storing, by the one or more processing circuits, the structured data in a database, wherein the database includes an established data channel between the database and a downstream source, and wherein the structured data is a unique representation within the database of the update, insertion, or deletion of the unstructured data.

In some embodiments, the method further includes recognizing, by the one or more processing circuits, that the unstructured data corresponds to a previously known schema, and in response to recognizing that the unstructured data corresponds to a previously known schema, executing, by the one or more processing circuits, a known transformation function corresponding to the previously known schema or initiating, by the one or more processing circuits, a schema inference process.

In some embodiments, the unstructured data includes information in a natural language format, and wherein determining the new schema further includes transforming, by the one or more processing circuits, the unstructured data into a single-layer structure, identifying, by the one or more processing circuits, one or more fields of the unstructured data by executing a pattern recognition function, classifying, by the one or more processing circuits, the identified fields, and establishing, by the one or more processing circuits, one or more relationships between the identified classified fields.

In some embodiments, the method further includes initializing, by the one or more processing circuits, the database, loading, by the one or more processing circuits, seed data from the upstream source, wherein the seed data includes reference data for the initialization of the database or test data for evaluating the functionality of the database, and storing, by the one or more processing circuits, data corresponding to the seed data within the database.

In some embodiments, the method further includes determining, by the one or more processing circuits, the significance of the update, insertion, or deletion of unstructured data, capturing, by the one or more processing circuits and responsive to determining the significance, a record of the update, insertion, or deletion of unstructured data, and storing, by the one or more processing circuits, the record in a transactional log of the database.

In some embodiments, normalizing the unstructured data occurs in real-time or near real-time, wherein the update, insertion, or deletion of the unstructured data in the upstream database is represented as the structured data in the database in real-time, and wherein each of the following steps occurs in real-time determining, by the one or more processing circuits, a new schema of the unstructured data using an inferring function, determining, by the one or more processing circuits, a divergence between the new schema and a previous schema of the unstructured data based on comparing the new schema to the previous schema of the unstructured data, and generating, by the one or more processing circuits, structured data including one or more pointers to the unstructured data, wherein generating the structured data includes normalizing the unstructured data.

In some embodiments, the method further includes analyzing, by the one or more processing circuits, metadata corresponding to the unstructured data, determining, by the one or more processing circuits, that the metadata corresponding to the unstructured data is unique within the database to prevent duplicate data entries, and storing, by the one or more processing circuits, the metadata corresponding to the unstructured data within the database.

In some embodiments, determining the new schema includes using an artificial intelligence (AI) algorithm, and wherein the AI algorithm determines the divergence between the new schema and the previous schema or compares the new schema to the previous schema.

Some embodiments relate to a system for maintaining data integrity, including a data processing system including memory and one or more processing circuits configured to identify an update, insertion, or deletion of unstructured data stored in an upstream source. The one or more processing circuits further configured to determine a new schema of the unstructured data using an inferring function. The one or more processing circuits further configured to determine a divergence between the new schema and a previous schema of the unstructured data based on comparing the new schema to the previous schema of the unstructured data. The one or more processing circuits further configured to generate structured data including one or more pointers to the unstructured data, wherein generating the structured data includes normalizing the unstructured data. The one or more processing circuits further configured to store the structured data in a database, wherein the database includes an established data channel between the database and a downstream source, and wherein the structured data is a unique representation within the database of the update, insertion, or deletion of the unstructured data.

In some embodiments, the one or more processing circuits further configured to recognize that the unstructured data corresponds to a previously known schema and in response to recognizing that the unstructured data corresponds to a previously known schema, execute a known transformation function corresponding to the previously known schema or initiate a schema inference process.

In some embodiments, the unstructured data includes information in a natural language format, and the one or more processing circuits are further configured to transform the unstructured data into a single-layer structure, identify one or more fields of the unstructured data by executing a pattern recognition function, classify the identified fields, and establish one or more relationships between the identified classified fields.

In some embodiments, the one or more processing circuits further configured to initialize the database, load seed data from the upstream source, wherein the seed data includes reference data for the initialization of the database or test data for evaluating the functionality of the database, and store data corresponding to the seed data within the database.

In some embodiments, the one or more processing circuits further configured to determine the significance of the update, insertion, or deletion of unstructured data, capture, responsive to determining the significance, a record of the update, insertion, or deletion of unstructured data, store the record in a transactional log of the database.

In some embodiments, normalizing the unstructured data occurs in real-time or near real-time, wherein the update, insertion, or deletion of the unstructured data in the upstream database is represented as the structured data in the database in real-time, and the one or more processing circuits are further configured to determine a new schema of the unstructured data using an inferring function, determine a divergence between the new schema and a previous schema of the unstructured data based on comparing the new schema to the previous schema of the unstructured data, and generate structured data including one or more pointers to the unstructured data, wherein generating the structured data includes normalizing the unstructured data.

In some embodiments, the one or more processing circuits are further configured to analyze metadata corresponding to the unstructured data, determine that the metadata corresponding to the unstructured data is unique within the database to prevent duplicate data entries, and store the metadata corresponding to the unstructured data within the database.

In some embodiments, determining the new schema includes using an artificial intelligence (AI) algorithm, and wherein the AI algorithm determines the divergence between the new schema and the previous schema or compares the new schema to the previous schema.

Some embodiments relate to one or more non-transitory computer-readable media (CRM) having instructions stored thereon that, when executed by at least one processing circuit, cause the at least one processing circuit to identify an update, insertion, or deletion of unstructured data stored in an upstream source.

The one or more non-transitory CRM having instructions stored thereon that, when executed by at least one processing circuit, cause the at least one processing circuit further to determine a new schema of the unstructured data using an inferring function. The one or more non-transitory CRM having instructions stored thereon that, when executed by at least one processing circuit, cause the at least one processing circuit further to determine a divergence between the new schema and a previous schema of the unstructured data based on comparing the new schema to the previous schema of the unstructured data. The one or more non-transitory CRM having instructions stored thereon that, when executed by at least one processing circuit, cause the at least one processing circuit further to generate structured data including one or more pointers to the unstructured data, wherein generating the structured data includes normalizing the unstructured data. The one or more non-transitory CRM having instructions stored thereon that, when executed by at least one processing circuit, cause the at least one processing circuit further to store the structured data in a database, wherein the database includes an established data channel between the database and a downstream source, and wherein the structured data is a unique representation within the database of the update, insertion, or deletion of the unstructured data.

In some embodiments, the one or more non-transitory CRM having instructions stored thereon that, when executed by at least one processing circuit, cause the at least one processing circuit further to recognize that the unstructured data corresponds to a previously known schema, and in response to recognizing that the unstructured data corresponds to a previously known schema, execute a known transformation function corresponding to the previously known schema or initiate a schema inference process.

In some embodiments, the unstructured data includes information in a natural language format, and wherein the processing circuit is further configured to transform the unstructured data into a single-layer structure, identify one or more fields of the unstructured data by executing a pattern recognition function, classify the identified fields, and establish one or more relationships between the identified classified fields.

In some embodiments, the one or more non-transitory CRM having instructions stored thereon that, when executed by at least one processing circuit, cause the at least one processing circuit further to initialize the database, load seed data from the upstream source, wherein the seed data includes reference data for the initialization of the database or test data for evaluating the functionality of the database, and store data corresponding to the seed data within the database.

Figure 1:
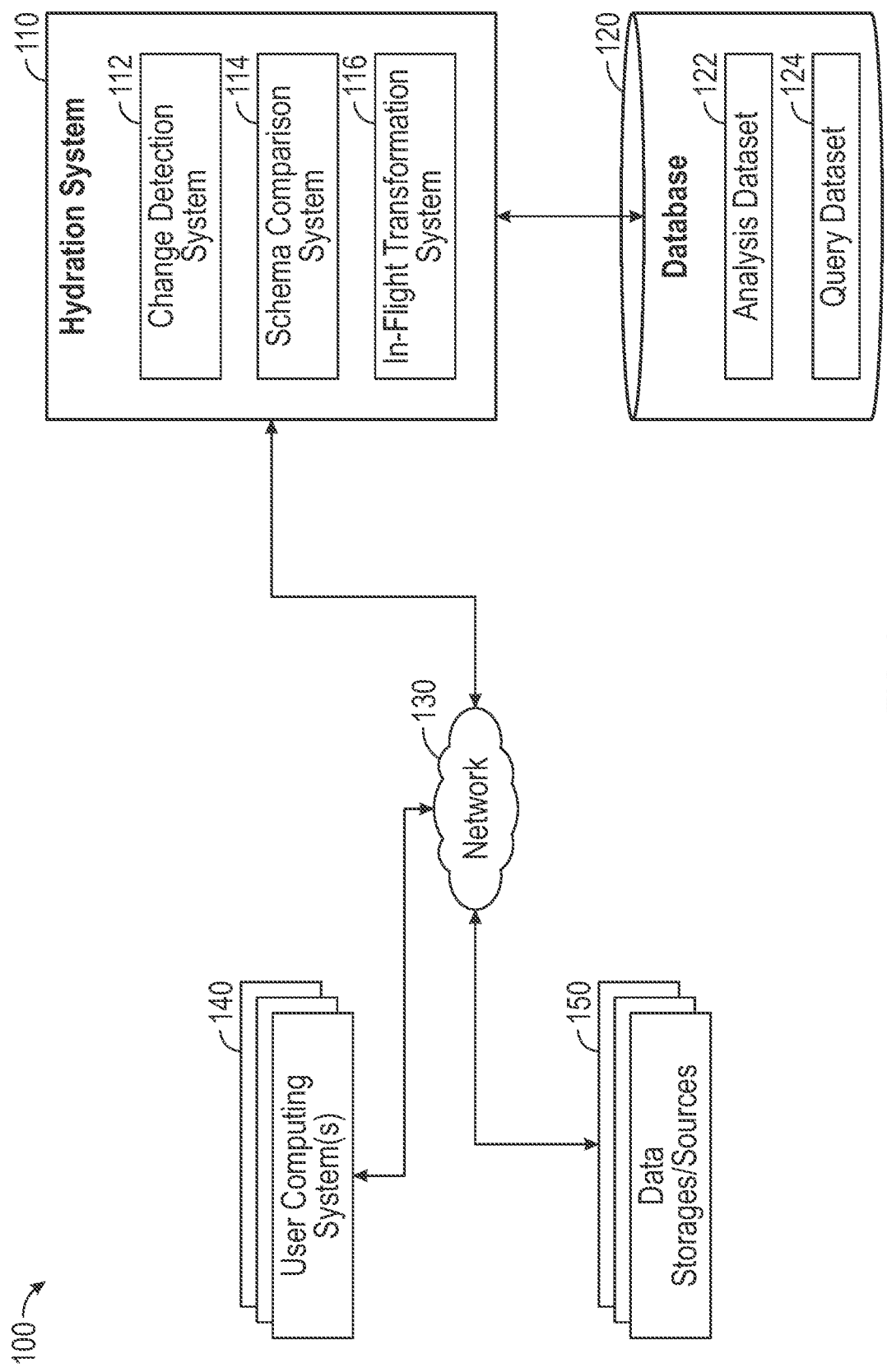
FIG. 1 is a block diagram depicting an implementation of a system for maintaining data integrity, according to some embodiments.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the Figures, the systems, apparatuses, and methods described herein relate to maintaining data integrity of a database or data lake. For many people and organizations, a data lake may serve as the central repository for the entity's data. An entity may choose to implement such a data lake to enable diverse query capabilities, data science use cases, the discovery of new information models, and more. However, such data lakes may be populated with data in various formats, including unstructured, semi-structured, and structured data. The differences between these data types can lead to complexities in harmonizing data various formats, ensuring data quality, and optimizing retrieval and analysis, especially in large-scale systems. To address these technical problems, the technical solution implemented herein includes a data lake hydration system offering data normalization and integration protocols to model a variety of data formats effectively. The hydration system includes a change detection system, schema comparison system, and in-flight transformation system to integrate unstructured data within a database or data lake. Accordingly, this system improves the process of handling diverse data formats, providing a unified solution that enables unstructured, semi-structured, and structured data to coexist in a data lake. The system also allows extraction, transformation, and loading (ETL) operations to be performed on the data irrespective of its original format.

Additionally, the present disclosure provides improvements in data quality compared to current technologies by reducing or eliminating duplicate entries are stored in the database or data lake. This can be achieved by a process where each update, insertion, or deletion of unstructured data can be analyzed and converted into a unique structured format. The system can implement one or more algorithms or models to identify and process new or modified information, ensuring that each stored entry is distinct (or unique) and representative of the latest data state. This approach to maintaining unique entries brings improvements to data management. Firstly, it reduces data redundancy, leading to more efficient use of storage resources and reducing the costs associated with data maintenance. Secondly, it improves data analytics, as the system can use streamlined datasets and analysts can avoid computational issues (e.g., increased computational load, inaccurate analytics) caused by duplicate records. Further, the reduction in data redundancy enhances the performance of data retrieval operations, with queries yielding faster and more accurate results due to the decreased dataset size. Thus, by ensuring data entries are unique, the system improves data integrity and contributes to the overall effectiveness and efficiency of computational operations.

Further, the present disclosure provides improvements over current technology by improving interoperability with a diverse spectrum of data sources and formats. By determining new schemas for unstructured data using an inferring function, the system handles data in natural language formats and other unstructured forms. It identifies divergences between these new schemas and any previously established schemas, allowing for the integration of diverse data types. This can be accomplished by transforming the unstructured data into a single-layer structure and executing pattern recognition functions to identify and classify fields, establishing relationships between them. The system's ability to infer and adapt schemas for various data types leads to improved data harmonization, making the database or data lake more versatile and accommodating to diverse data sources with diverse data formats. This flexibility improves computer performance in handling data including a mix of structured, semi-structured, and unstructured data, and allows more comprehensive data analysis and utilization.

Further, this enhanced compatibility with diverse data types improves the computational efficiency of data management and allows a greater number of data science applications and analytics. By normalizing and integrating disparate data, the system can identify previously overlooked data trends and patterns, thereby improving analytics performance.

Additionally, the present disclosure provides improvements in speed and efficiency compared to current technologies. One feature is the real-time or near real-time processing of unstructured data, allowing changes in the upstream source to be reflected in the database. This immediacy facilitates quicker follow-up operations in the database, such as queries or analyses. Further efficiency gains are achieved through the integration of changed data capture (CDC) functionality. CDC allows the system to prioritize processing new or modified data rather than reprocessing the entire dataset, significantly reducing the time and computational resources required for data updates. The systems and methods herein can also include an initial step of database initialization, including loading specific seed data. Once this initialization is completed, the system can be optimized to handle subsequent data updates more efficiently because it is unnecessary to process the entire dataset in the database. This structured approach to initializing and updating the database means that, post-setup, the system uses less processing power to integrate new data or to adapt to changes, contributing to overall system efficiency. This streamlined process accelerates data processing speed and improves the system's responsiveness in dealing with diverse data types.

Additionally, the present disclosure provides advancements in operational scalability and adaptability. This scalability is achieved through the system's capability to dynamically adjust to new data structures, efficiently processing and integrating diverse data forms, including unstructured and semi-structured data. The ability to process diverse data and incorporate various data types and structures allows for expansion of the data repository, even as data types or formats change over time. This adaptability can improve computational efficiency in environments where data requirements evolve rapidly, ensuring that the system can process diverse data types without performance degradation. Additionally, the initial database initialization step, which includes loading specific seed data, reduces computational intensity when additional data is added to the database in the future. This preparatory phase can minimize the system having to reprocess or reevaluate the entire dataset with each new addition or modification, thereby reducing computational overhead. This feature is beneficial for large-scale data environments, where the volume of data can be large and continuously growing. The system's capability to efficiently manage this growth without constantly and extensively performing data re-evaluation or reprocessing increases the system's effectiveness in processing continuous data expansion and complexity.

As used herein, "unstructured" data refers to data that is deficient in a predefined format or structure, such as free-form text, multimedia, and other forms of data typically used in human communication. This type of data is prevalent in the digital world and includes a wide range of information, from email correspondence and social media posts to digital photographs and video content. Unstructured data poses unique challenges in data management due to its lack of uniformity, making it difficult to categorize and analyze using traditional database tools.

As used herein, "semi-structured" data, such as JSON or XML data, contains tags or markers to separate semantic elements of the data but often does not conform to a predefined format typically found in databases or data lakes. For the purposes of this disclosure, semi-structured data is considered closer (or more similar to) to unstructured data due to its flexible format. In some embodiments, unstructured data can include semi-structured data. That is, a recitation of "structured and/or unstructured data" or the like can include one or more of structured data, semi-structured data, and unstructured data. This categorization can be made because, although semi-structured data contains some organizational properties, it lacks the predefined structure of structured data and presents a blend of characteristics from both structured and unstructured data types.

As used herein, "structured" data refers to data organized according to a specific schema or format, facilitating systematic storage, retrieval, and analysis. This can include tabular data, such as that in spreadsheets and databases, and data in other structured forms that follow patterns or arrangements. Structured data is distinguished by its predictability and the process in which it can be accessed and queried. Examples include a wide range of applications, from customer details in CRM systems and financial transactions in banking systems to sensor outputs in monitoring devices and metadata in digital libraries.

As used herein, "schema" refers to the structured layout or blueprint of a database or data lake, as well as the format of individual data entries within these systems. When referring to a database, the schema can define how data is organized, stored, and processed within the database, including the arrangement of tables, fields, and the relationships between them. A schema in the context of a data entry refers to the specific structure or format that individual data items adhere to, such as the format of a date, the allowable range of values for a particular field, or the structure of a complex data object.

As used herein, "data lake" and "database" are terms used to describe systems for storing, modeling, and managing data. While both terms are used for data storage, a "database" can refer to a structured collection of data, often stored in a tabular format and designed for specific, structured queries and operations. In contrast, a "data lake" is a flexible storage solution that can store a large amount of raw data in its native format, accommodating structured, semi-structured, and unstructured data. For the purposes of this disclosure, the terms can be used interchangeably when referring to the storage and management of a wide variety of data types, particularly in scenarios where the system handles a blend of structured and unstructured data included in the same data source.

Referring generally to the FIGS., disclosed are systems and methods for maintaining data integrity (e.g., of a database, a data lake, etc.). In some embodiments, the one or more processing circuits of the system can identify an update, insertion, or deletion of unstructured data stored in an upstream source. The processing circuits can also determine a new schema of the unstructured data using an inferring function and further determine a divergence between the new schema and a previous schema of the unstructured data based on comparing the new schema to the previous schema of the unstructured data. In some embodiments, the processing circuits can store the structured data in a database. The database can include an established data channel between the database and a downstream source, and the structured data can be a distinct (or unique) representation within the database of the update, insertion, or deletion of the unstructured data.

Referring now to FIG. 1, a block diagram depicting an example of a hydration system 110 and a computing environment 100 is shown, according to some embodiments. As shown, the computing environment 100 includes a database 120, a network 130, one or more user computing systems 140, and one or more data sources 150. The hydration system 110 can be communicatively coupled, via the network 130, to the database 120, the user computing system 140, and the data sources 150. The database 120, the user computing system 140, and/or the data sources 150 can initiate and/or route (e.g., provide) event data and other types of data, such as additional data that can be used in modeling an entity or business event dataset (e.g., resource allocations, inventory updates, etc.) by the hydration system 110. The database 120 and the data sources 150 provide data via various separate communication pipelines (e.g., network channels, data communication channels, and/or data feeds), which can be used in modeling by the hydration system 110. For example, the hydration system 110 can provide a single application programming interface (API) or multi-APIs to access various data generated or routed by the database 120, the user computing system 140, and/or the data sources 150. In some embodiments, the hydration system 110 can provide data to the database 120 and/or data sources 150 via various separate communication pipelines (e.g., network channels, data communication channels, and/or data feeds).

Referring to FIG. 1, the hydration system 110 is shown to include a change detection system 112, a schema comparison system 114, and an in-flight transformation system 116. The hydration system 110 is shown to be communicatively coupled to the database 120, which includes an analysis data set 122 and a query data set 124. These computing systems can include at least one processor (e.g., a physical processor and/or a virtualized processor) and at least one memory (e.g., a memory device and/or virtualized memory). The database 120, network 130, user computing systems 140, and/or data sources 150 can also include at least one processor (e.g., a physical processor and/or a virtualized processor) and at least one memory (e.g., a memory device and/or virtualized memory).

In some embodiments, the database 120 and/or the data sources 150 (hereafter referred to as "data sources 150") can provide data to the hydration system 110. In some embodiments, the database 120 and/or the data sources 150 can be structured to collect data from other devices on network 130 (e.g., user computing systems 140) and relay the collected data to the hydration system 110. In some embodiments, the database 120 and/or the data sources 150 can host or otherwise support a search or discovery engine for Internet-connected devices. The search or discovery engine can provide data, via the network 110, to the analysis system 150. In one example, a third party (e.g., a business entity) can have a server and database (e.g., data lake) that stores business events associated with the third party. For example, a database of an entity can store data associated with one or more business transactions of the entity. In this example, the analysis system 150 can request data associated with specific data stored (e.g., transactions) in the data source (e.g., database 120 and/or data sources 150) of the third party. In some embodiments, the database 120 and/or the data sources 150 can be data lakes, data marts, or other types of databases. For example, the database 120 can be a downstream data store (or target store for storing modified input data). For example, the data sources 150 can be one or more upstream data sources (e.g., providing input data to one or more elements of the computing environment 100).

In some embodiments, the database 120 and/or the data sources 150 can provide data to the hydration system 110 (e.g., various data sources and/or data feeds) including data associated with a specific entity (e.g., client, etc.). In various arrangements, the database 120 and/or the data sources 150 can facilitate the communication of data between a first user computing system (e.g., provider computer system 140) and a second user computing system (e.g., third party user computing system 140), such that the database 120 and/or the data sources 150 receive data (e.g., over network 130) from one or more of the user computing systems 140 to send the data to other systems described herein (e.g., hydration system 110). In some embodiments and as described herein, the user computing systems 140, the database 120, and/or the data sources 150 can send data directly, over the network 130, to any system described herein and the database 120 and/or the data sources 150 can provide information not provided by any of the user computing systems 140. For example, the database 120 and/or the data sources 150 can provide supplemental or additional event/activity data as discussed above.

The database 120 and/or the data sources 150 can include a plurality of data types and structures. For example, the database 120 and/or the data sources 150 can include a blend of the following data types: unstructured data (e.g., data that is deficient in a predefined format or structure, such as free-form text, multimedia, email, social media postings, other forms of data typically used in human communication); semi-structured data (e.g., data that contains tags or markers to separate semantic elements of the data but often does not conform to a predefined format, such as JSON data, XML data, etc.); and/or "structured" data (e.g., data that adheres to a predefined format, such as tabular data found in spreadsheet, customer information in a CRM system, transaction records in financial databases, and sensor readings in scientific databases, etc.). As used herein, the terms "structured and unstructured data," "structured/unstructured data," and the like can be used to refer to a mix of structured data, semi-structured data, and unstructured data, in addition to further data types. In storing data of a variety of data types, the database 120 and/or the data sources 150 can determine that data stored is distinct (or unique) in the respective database (e.g., no duplicate entries exist).

In some embodiments, the one or more user computing systems 140 can include a third party computing system 140 and can be used by a vendor or third party with a relationship to a provider (e.g., vendor, supplier, business partner, and so on) to perform various actions and/or access various types of data, some of which can be provided over network 130. A "third party" as used herein can refer to an individual operating a third party computing system 140, interacting with resources or data via the third party computing system 140. In some arrangements, the third party can include an organization's partner institutions and/or third-parties. The third party computing system 140 can be used to electronically transmit data (e.g., event data) to the hydration system 110. In some embodiments, the third party computing system 140 can be used to transmit data to the database 120 and/or the data sources 150. The third party computer system 140 can also be used to access websites (e.g., using an Internet browser), and entity graphical interfaces (e.g., entity dashboard), and/or to receive any other type of data. For example, a third party can be a business entity accessing or updating structured and/or unstructured data. For example, a third party can be a software provider that includes software used by the business entity for financial or human resource-related tasks or actions. In some embodiments, the one or more user computing systems 140 can be provider computing system 140 and operate the same or similar to the third party computing system 140, as described above.

The hydration system 110 can be configured to facilitate communication (e.g., via network 130) between the database 120, network 130, user computing systems 140, data sources 150, and/or additional systems described herein (e.g., change detection system 112, schema comparison system 114, in-flight transformation system 116, etc.). The facilitation of communication can be implemented as an application programming interface (API) (e.g., REST API, Web API, and/or customized API, etc.), batch files, and/or queries. In various arrangements, the hydration system 110 can also be configured to control access to resources of the hydration system 110 and database 120. The API can be used by the hydration system 110 and/or computing systems to exchange data and make function calls in a structured format. For example, the hydration system 110 can receive a dataset of a plurality of business events from a records system. The API can be configured to specify an appropriate communication protocol using a suitable electronic data interchange (EDI) standard or technology. In some arrangements, data is exchanged by components of the hydration system 110 using web services. Where data is exchanged using an API configured to exchange web service messages, some or all components of the computing environment can include or can be associated with (e.g., as a client computing device) one or more web service node(s).

The hydration system 110 can communicate over the network 130 via a variety of architectures (e.g., client/server, peer-to-peer). The hydration system 110 and/or database 120 can generate and provide datasets (e.g., an initialization dataset, an analysis dataset 122, a query dataset 124, etc.). The hydration system 110 can be communicatively and operatively coupled to the database 120, which can store a variety of information relevant to date and/or data schemas modeled by one or more modelers (e.g., schema comparison system 114, inflight-transformation system 116, etc.). In some embodiments, the hydration system 110 can receive information from the user computing systems 140 and/or data sources 150. The hydration system 110 can request and/or provide input to the analysis dataset 122 and/or the query dataset 124 of the database 120 (e.g., for information and/or to store information in the database 120). In some embodiments, the database 120 includes various transitory and/or non-transitory storage media. The storage media can include optical storage, flash storage, RAM, or any types of devices and technologies used to store digital data. The database 120 and/or the hydration system 110 can use various APIs to perform database functions (i.e., managing data stored in the database 120). The APIs can include, for example, SQL, NoSQL, NewSQL, ODBC, and/or JDBC.

As described above, the hydration system 110 can include the change detection system 112, the schema comparison system 114, and the in-flight transformation system 116. In some embodiments, the change detection system 112 can be included in the hydration system 110 to allow real-time identification and capture of data modifications across the computing environment 100 (e.g., a changed data capture or "CDC" function, etc.). In some embodiments, the change detection system 112 is configured to monitor updates (e.g., changes, alterations) of data in the data source (e.g., database 120 and/or data sources 150) via one or more data pathways.

For example, the change detection system 112 can detect updates to structured and/or unstructured data within the database 120. For example, the change detection system 112 can detect new transaction records being added or existing records being modified (e.g., via the change detection system 112 subscribing to database event notifications, polling the database at regular intervals, etc.). In some embodiments, responsive to identifying changes, the change detection system 112 can trigger or activate additional actions by the hydration system 110 (e.g., initiating the schema comparison system 114 to determine a schema of structured/unstructured data, initiating the in-flight transformation system 116 to adjust data models in response to the detected updates, etc.). In some embodiments, the change detection system 112 can execute (or integrate) a CDC function (also referred to herein as a "changed data capture function") to automatically, detect, capture, and/or relay the changed data elements to the hydration system 110, minimizing data transfer volumes and optimizing network utilization. Furthermore, the change detection system 112 can process updates to a data source (e.g., database 120) and/or incrementally, enhancing system performance by identifying changes in data. The change detection system 112 can thereby avoid computational costs of scanning the entire data source/dataset to determine changes and increase the efficiency and performance of computing devices implementing the change detection system 112.

In some embodiments, the change detection system 112 can implement a log-based CDC function (e.g., data synchronization function, audit trail generation function event-driven architecture (EDA) function, etc.) by utilizing database transaction logs (e.g., write-ahead logging (WAL) of an SQL, etc.). For example, the change detection system 112 can monitor a database transaction log for changes and parse the database transaction logs to identify and extract modifications without querying the database directly. In some embodiments, the change detection system 112 can implement a time-based (e.g., timestamp-based) CDC method (e.g., utilizing system-versioned temporal tables, etc.). For example, the change detection system 112 can add system-time columns to database tables, which can be used to determine the period for which each record of the database is valid, and the change detection system 112 can query temporal tables (e.g., query dataset 124) for records altered within a specific timeframe. The change detection system 112 can execute a trigger-based CDC function (e.g., via a data replication function, a data transformation and loading function (ETL and/or UTL), an audit logging function, etc.) by creating database triggers within a database (e.g., database 120 or data sources 150) and/or being configured to respond to the database triggers of the database. The database triggers can be set to automatically record changes into a shadow (or monitored) table (e.g., database utilized for logging insertions, updates, and deletions) when a data manipulation language (DML) operation occurs on the monitored table. The change detection system 112 can periodically (or repeatedly, or according to a prespecified time) scan the monitored/shadow table for new entries (e.g., entries representing the latest data modifications). In some embodiments, the change detection system 112 can execute a trigger-based CDC function (e.g., for various relational database management systems such as SQL databases). For example, a plurality of database triggers (e.g., update triggers, load triggers, modifications triggers, etc.) can be established on tables within the database 120 and/or the data sources 150, and the database triggers can act upon specific data manipulation events (e.g., insert, update, or delete operations) by logging the changes into a designated shadow table stored in a database (e.g., database 120 and/or the data sources 150, etc.). The change detection system 112 can periodically and/or automatically review entries in the shadow table to detect and process recent data modifications without requiring a full load of the input database.

The hydration system 110 can also include the schema comparison system 114. In some embodiments, the schema comparison system 114 can manage and align data of a plurality of data types (e.g., structured, unstructured, etc.) from various sources (e.g., database 120, data sources 150, etc.) within the computing environment 100. For example, the schema comparison system 114 can examine and compare schemas of input data (e.g., collected via the database 120) to one or more predefined data models of the hydration system 110 (e.g., Parquet format, columnar format), which can be illustrated by one or more data entries of the database 120. The schema comparison system 114 can output a result (e.g., match, non-match, partial match, etc.) based on comparing the schemas of the data, which can be utilized by the in-flight transformation system 116.

In some embodiments, the schema comparison system 114 can execute an artificial intelligence (AI) function or machine learning (ML) models trained to recognize patterns indicating schema differences or divergences between source data and previously stored data (e.g., new columns in input data, altered data types, format changes, etc.). In some embodiments, the schema comparison system 114 can infer a schema using a schema inference process/technique/algorithm (e.g., by inferring or predicting a schema using an AI function and metadata associated with the source data). For example, the schema comparison system 114 can analyze version control history or data lineage records to predict and adapt to schema modifications preemptively. In another example, the schema comparison system 114 perform differential analysis (e.g., by comparing snapshots of database schemas at different times to identify changes), which can include querying metadata tables containing metadata (e.g., database 120, etc.) or using schema versioning tools that track changes across the database 120 and data sources 150. Responsive to identifying schema alterations (e.g., a difference between an input schema of input data and a stored/predetermined schema associated with stored data and/or a target database), the schema comparison system 114 can initiate appropriate actions within the hydration system 110, such as triggering the in-flight transformation system 116 to update data models to reflect the new schema structure, updating the input data to match/align with a predetermined schema (e.g. of database 120), and for other purposes related to ensuring data consistency and integrity throughout the components of the computing environment 100.

In another example, a company may desire to migrate data from legacy systems to a new business intelligence platform. The schema comparison system 114 can utilize the ML models to analyze the structure of datasets in the legacy system and the new platform. The schema comparison system 114 can identify discrepancies such as new columns added or changes in data formats to align with the new platform's requirements. In yet another example, an organization can utilize the schema comparison system 114 to manage the synchronization of data between on-premises databases and a cloud data warehouse. As data structures change over time due to business needs changing, new data types or columns might be introduced in the on-premises databases. The AI function executed by the schema comparison system 114 can detect these changes by comparing schemas and predict how the cloud data warehouse schema should be updated. In yet another example, an IoT (Internet of Things) application can collect data from various sensors deployed across a smart city infrastructure. The data formats and schemas may vary due to the diverse types of sensors and their firmware. The schema comparison system 114, executing the ML models, can analyze the incoming data streams in real-time, and identify any new data points or format changes introduced by, for example, firmware updates.

In some embodiments, in response to the schema comparison system 114 determining a difference between the schema of input data (e.g., unstructured data provided via user computing devices 140) and the schema of existing data/predefined models (e.g., structured), the in-flight transformation system 116 can perform data transformation operations on the input data to incorporate new fields or data types identified in the incoming data (e.g., metadata, keys, columns, etc.) into a target database (e.g., database 120). For example, in response to receiving unstructured data as input data via one or more components of the computing environment 100, the schema comparison system 114 can employ computational techniques or algorithms (e.g., natural language processing (NLP) techniques, etc.) to analyze and extract key information (e.g., data fields such as event types, product identifiers, activity data, etc.) and to structure one or more of the extracted data fields into predefined categories and/or formats that align with a previously known schema (e.g., a schema of database 120). For example, when the schema comparison system 114 encounters text-based event data, it can utilize NLP algorithms to extract key information the data, extracting structured information such as event/activity types and specific identifiers (product IDs, service types) as fields used in creating a structured variant of the input data (e.g., by categorizing data into columns such as "Events", "Activities", etc.) As such, this structured data can be mapped and formatted according to the predefined schema of database 120, for example.

The in-flight transformation system 116 can operate on data "in-flight," meaning it can process data as the data moves between systems (e.g., between user computing systems 140 and hydration system 110, between hydration system 110 and database 120, etc.) and before the data is stored in a final storage destination (e.g. database 120, data source 150, etc.). The in-flight transformation system 116 can convert unstructured or semi-structured data into structured formats that comply with the predefined schemas of destination databases (e.g., database 120), which can include parsing JSON or XML payloads into relational database formats, transforming timestamps across different data sources to a uniform standard, etc. Further, as the data is transmitted between the source and target, the in-flight transformation system 116 can map incoming data fields to the target schema fields and adjust input data structures in real-time (or near real-time, such as 50 milliseconds) to match destination schemas (e.g., a schema structured data stored in a target data source, such as data source 150). This can include adding, removing, or transforming data fields based on the schema comparison system 114's detection of divergences in schemas.

In some embodiments, the in-flight transformation system 116 can also normalize input data while transmitting the input data to the target database by standardizing formats and/or fields of the input data to align with a predetermined schema of the target database. In some embodiments, the in-flight transformation system 116 can also normalize the input data by applying a default (or predetermined) schema to the input data (e.g., a schema associated with one or more datasets and/or data entries of the database 120 and/or data sources 150). Various data normalization techniques (e.g., Z-score Normalization, Min-Max Normalization, and Normalization by decimal scaling, etc.) can be utilized by the in-flight transformation system 116 in normalizing the data in-flight.

Further, as described above, the hydration system 110 can communicatively couple to the database 120, which includes the analysis dataset 122 and the query dataset 124. In some embodiments, the analysis dataset 122 and/or the query dataset 124 can be databases, data lakes, or other types of data repositories. For example, the analysis dataset 122 can be a dataset containing data from the database 120 in a refined format (e.g., in a reduced data size/format optimized for performing data analytics functions). For example, the query dataset 124 can be an operational database (e.g., MySQL, PostgreSQL) and allow a user and/or one or more components of the computing environment 100 (e.g., by change detection system 112 executing a function, etc.) to perform queries on data contained in the database 120.

The database 120, analysis dataset 122, and/or query dataset 124 can store data transformed by the in-flight transformation system 116 (e.g., unstructured input data can be stored as structured data). In storing data transformed by the in-flight transformation system 116, the components of the computing environment 100 (e.g., hydration system 110, database 120, etc.) can utilize various techniques to determine that data stored in a database or dataset (e.g., analysis dataset 122, query dataset 124, etc.) is a distinct representation of the data in the database (e.g., no duplicate entries are stored). For example, the database 120 can execute one or more deduplication functions (e.g., storage-based deduplication functions, in-line network-based functions, etc.) to avoid storing duplicate entries in the analysis dataset 122 and/or query dataset 124. In some embodiments, the hydration system 110 and/or database 120 can verify a new data entry is distinct within the analysis dataset 122 and/or query dataset 124 by comparing data fields of the new data entry (e.g., metadata, IDs, keys, etc.) to analogous fields of data already stored in the database 120. For example, the database 120 could use metadata IDs as an analogous field to store a "patient ID" used by a healthcare system to uniquely identify patient records.

Figure 2:
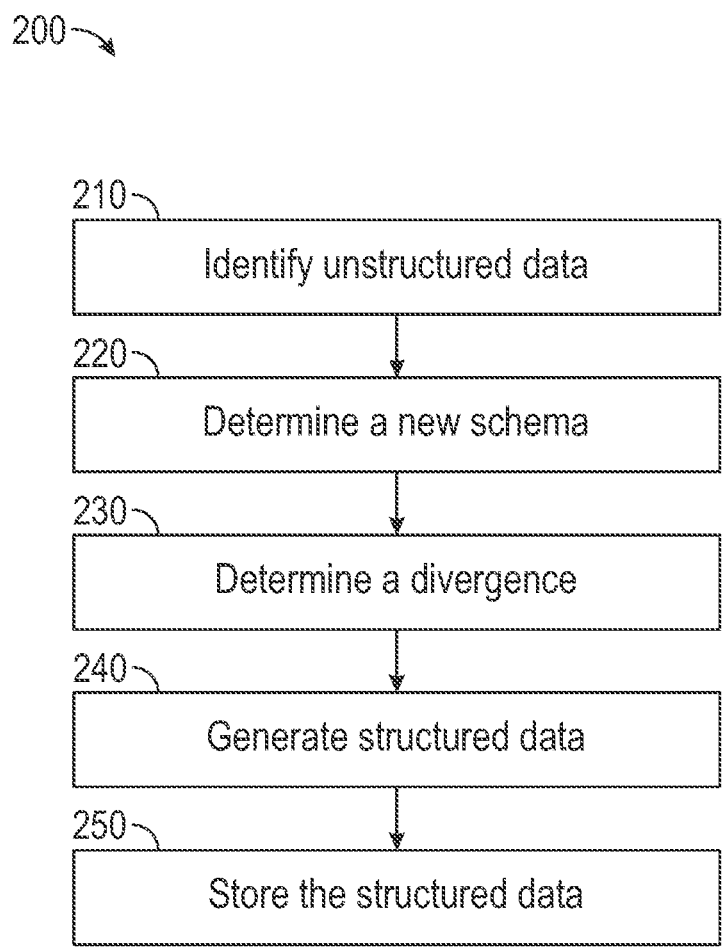
FIG. 2 is a flowchart for a computer-implemented method for maintaining data integrity, according to some embodiments.

Referring now to FIG. 2, a flow diagram for a method 200 of maintaining data integrity is shown, according to some embodiments. One or more of the components of the computing environment 100 described with respect to FIG. 1 can be used to perform the steps of the method 200. For example, the hydration system 110 can perform one or more of the steps of the method 200.

In a broad overview of method 200, at block 210, the one or more processing circuits (e.g., hydration system 110 in FIG. 1), identify unstructured data. At block 220, the one or more processing circuits can determine a new schema. At block 230, the one or more processing circuits can determine a divergence. At block 240, the one or more processing circuits can generate structured data. At block 250, the one or more processing circuits can store the structured data. Additional, fewer, or different operations can be performed depending on the particular arrangement. In some embodiments, some, or all operations of method 200 can be performed by one or more processors executing on one or more computing devices, systems, or servers. In some embodiments, each operation can be re-ordered, added, removed, or repeated.

At block 210, the one or more processing circuits can identify unstructured data. In one embodiment, the one or more processing circuits can identify an update, insertion, deletion, or other data change of unstructured data stored in an upstream source (e.g., data sources 150 of FIG. 1). The unstructured data can include any data without a predefined format (e.g., free-form text) or data that fails to adhere to a predefined target of a downstream source (e.g., database 120 of FIG. 1). In some embodiments, the processing circuits can identify a data modification at block 210.

For example, at block 210, the processing circuits (e.g., change detection system 112 of FIG. 1) can utilize a changed data capture (CDC) function to determine whether data of a database is updated (e.g., modifications, insertions, deletions, etc.). For example, at block 210, the one or more processing circuits can detect updates to structured and/or unstructured data within the a database (e.g., database 120) when new transaction records are added or existing records are modified. In an embodiment, upon identifying changes, the one or more processing circuits can trigger specific processes within the hydration system 110 (e.g., initiating the schema comparison system 114 to determine a schema of structured/unstructured data, initiating the in-flight transformation system 116 to adjust data models in response to the detected updates, etc.). In some embodiments, the one or more processing circuits can execute a CDC function to automatically, detect, capture, and/or relay only the changed data elements to the hydration system at block 210.

At block 220, the one or more processing circuits can determine a new schema (e.g., data format of unstructured input data). In some embodiments, the one or more processing circuits can determine a new schema of the unstructured data using an inferring function (e.g., AI/ML algorithm, etc.). As described herein, inferring a new schema of the unstructured data at block 220 can include utilizing statistical analysis techniques or implementations (e.g., identifying common patterns, distributions, or correlations within the data that suggest a particular schema), by executing AI/ML functions and/or algorithms, by comparing the data against known schemas/reference schemas (e.g., to identify similarities or deviations between the new schema of the unstructured input data and the known/predetermined schemas), and/or otherwise. In some embodiments, NLP functions or other semantic analysis tools can be utilized at block 220 by the one or more processing circuits to determine keywords, identify the presence of specific fields, and/or gather metadata.

For example, at block 220, the one or more processing circuits can be integrated within the hydration system 110 to determine a new schema by analyzing data of a plurality of data types (e.g., structured, unstructured, etc.) from various sources (e.g., database 120, data sources 150, etc.) within the computing environment 100. For example, at block 220 the one or more processing circuits can examine and compare schemas of input data (e.g., collected via the database 120) to one or more predefined data models of the hydration system 110 (e.g., columnar format).

In some embodiments, a statistic analysis technique or implementation is configured to allow the processing circuits to parse through data to identify patterns, correlations, or distributions. For example, by analyzing the frequency of certain terms or values, the processing circuits (utilizing the tool) can suggest a schema that categorizes data based on common topics or attributes. In another example, the processing circuits (utilizing the tool) can analyze the distribution of data points to infer a schema that segments the data into different classifications or groups, enhancing the organization and understanding of the dataset. In yet another example, by identifying correlations between different data fields, the processing circuits (utilizing the tool) can determine a relational schema that links related fields together.

At block 230, the one or more processing circuits can determine a divergence. In an embodiment, the one or more processing circuits can determine a divergence (or difference) between the new schema and a previous schema of the unstructured data based on comparing the new schema to the previous schema of the unstructured data. For example, at block 230, the one or more processing circuits can output a divergence result (e.g., match, non-match, partial match, etc.) based on comparing the schemas of the data, which can be further utilized as described herein (e.g., regarding the in-flight transformation system 116).

In some embodiments, the processing circuits can determine divergences by comparing structural elements, data types, and organization between the new and previous schemas of the unstructured data. This comparison can include parsing schema definitions, identifying specific attributes such as field names, data types, and their hierarchical organization to identify any variations. The processing circuits can perform schema mapping, aligning elements from both schemas to highlight additions, deletions, or alterations in the data structure. The processing circuits can use the schemas' metadata to determine changes in context (e.g., not just syntactical but also semantical). The divergence determination can include evaluating compatibility issues that might occur due to these schema changes. The output can be a categorized report of divergences, including matches, non-matches, and partial matches.

For example, a match can occur when a field such as "customer ID" in the new schema exactly aligns with the same field in the previous schema, indicating no changes were made. In another example, a non-match can be identified when a new field, such as "social media handles," is introduced in the new schema without any corresponding field in the previous schema, indicating a clear addition. In yet another example, a partial match can be identified when a field such as "address" in the new schema is split into "street address" and "zip code" in the previous schema, suggesting a refinement or reorganization of data structure rather than a complete change. In some embodiments, the outputted divergence result can indicate or highlight the instances of matches, non-matches, and partial matches, providing an indication of compatibility of the modified data structure with existing systems.

At block 240, the one or more processing circuits can generate structured data. In some embodiments, the one or more processing circuits can generate structured data (e.g., tabular data) including one or more pointers (e.g., memory addresses located in computer memory, etc.) to the unstructured data. For example, at block 240, the in-flight transformation system 116 can generate structured data (e.g., in-flight as the data moves between systems and before the data is stored in a final storage destination, such as database 120). At block 240, the in-flight transformation system 116 can convert unstructured or semi-structured data into structured formats that comply with the predefined schemas of destination databases (e.g., database 120).

In some embodiments, at block 240, the in-flight transformation system 116 can generate structured data by performing data transformation operations on input data to incorporate new fields or data types identified in the incoming data (e.g., metadata, keys, columns, etc.) into a target database (e.g., database 120). For example, at block 240, in response to receiving unstructured data as input data via one or more components of the computing environment 100, the schema comparison system 114 can employ computational techniques or algorithms (e.g., natural language processing (NLP) techniques, etc.) to analyze and extract key information (e.g., data fields such as event types, product identifiers, activity data, etc.). At block 240, the schema comparison system 114 can further structure one or more of the extracted data fields into predefined categories and/or formats that align with a previously known schema (e.g., a schema of database 120).

In some embodiments, generating the structured data at block 240 can include normalizing the unstructured data. For example, at block 240, the in-flight transformation system 116 can normalize input data while transmitting the input data to the target database by standardizing formats and/or fields of the input data to align with a predetermined schema of the target database. In some embodiments, the in-flight transformation system 116 can also normalize the input data by applying a default (or predetermined) schema to the input data (e.g., a schema associated with one or more datasets and/or data entries of the database 120 and/or data sources 150). Furthermore, the refinement using normalization can ensure that, as the data transitions between sources and destinations, it adheres to the uniformity and standards for integration into the target database 120. Normalization can include reformatting of data elements to match the expectations of database schemas, including the adjustment of data formats, the alignment of data fields to predefined structures, and the resolution of discrepancies in data representation. Moreover, the processing circuits as natural language processing (NLP) to parse and interpret the semantic content of unstructured data. This can allow the processing circuits to autonomously identify and extract data points, such as specific event types, product identifiers, or activity data, that can be important for the operational or analytical requirements of the receiving systems. By dynamically structuring these extracted elements into categories and formats that are compatible with the established schemas of the destination databases (e.g., database 120), the processing circuits can ensure that the transformed data is immediately actionable, queryable, and accessible.

For example, the processing circuit could receive a stream of social media posts as unstructured data. In this example, the processing circuits can parse the text, extracting and categorizing hashtags, mentions, and sentiment scores into structured fields within a table, preparing the data for analysis in database 120. In another example, sensor data from a network of IoT devices can be ingested by the processing circuits as semi-structured JSON objects. In this example, the processing circuits can normalize the data by converting timestamps to a uniform format, categorizing device types, and mapping sensor readings to columns in a relational database schema.

In some embodiments, the one or more processing circuits can be configured to normalize or "flatten" input data at block 240 (e.g., during an in-flight transformation executed by the in-flight transformation system 116) and/or at block 250 (e.g., in storing the updated input data in a target data store such as database 120). For example, the one or more processing circuits can convert data having a hierarchical structure (e.g., linked list, tree, etc.) into a single-level structure (e.g., array). For example, the one or more processing circuits can normalize/flatten data by executing a data normalization function (e.g.,). In some embodiments, the normalized/flattened data can include pointers to unstructured input data.

At block 250, the one or more processing circuits can store the structured data. In some embodiments, at block 250, the processing circuits can store the structured data in a database, and the database can include an established data channel between the database and a downstream source. In some embodiments, the structured data is a unique (or distinct) representation within the database of the update, insertion, or deletion of the unstructured data. In storing data generated at block 240 (e.g., transformed by the in-flight transformation system 116), the components of the computing environment 100 (e.g., hydration system 110, database 120, etc.) can utilize various techniques to determine that data stored in a database or dataset (e.g., analysis dataset 122, query dataset 124, etc.) is a unique representation of the data in the database (e.g., no duplicate entries are stored). For example, at block 250, the database 120 can execute one or more deduplication functions (e.g., storage-based deduplication functions, in-line network-based functions, etc.) to avoid storing duplicate entries in the analysis dataset 122 and/or query dataset 124. In some embodiments, at block 250, the hydration system 110 and/or database 120 can verify a new data entry is unique within the analysis dataset 122 and/or query dataset 124 by comparing data fields of the new data entry (e.g., metadata, IDs, keys, etc.) to analogous fields of data already stored in the database 120.

Figure 3:
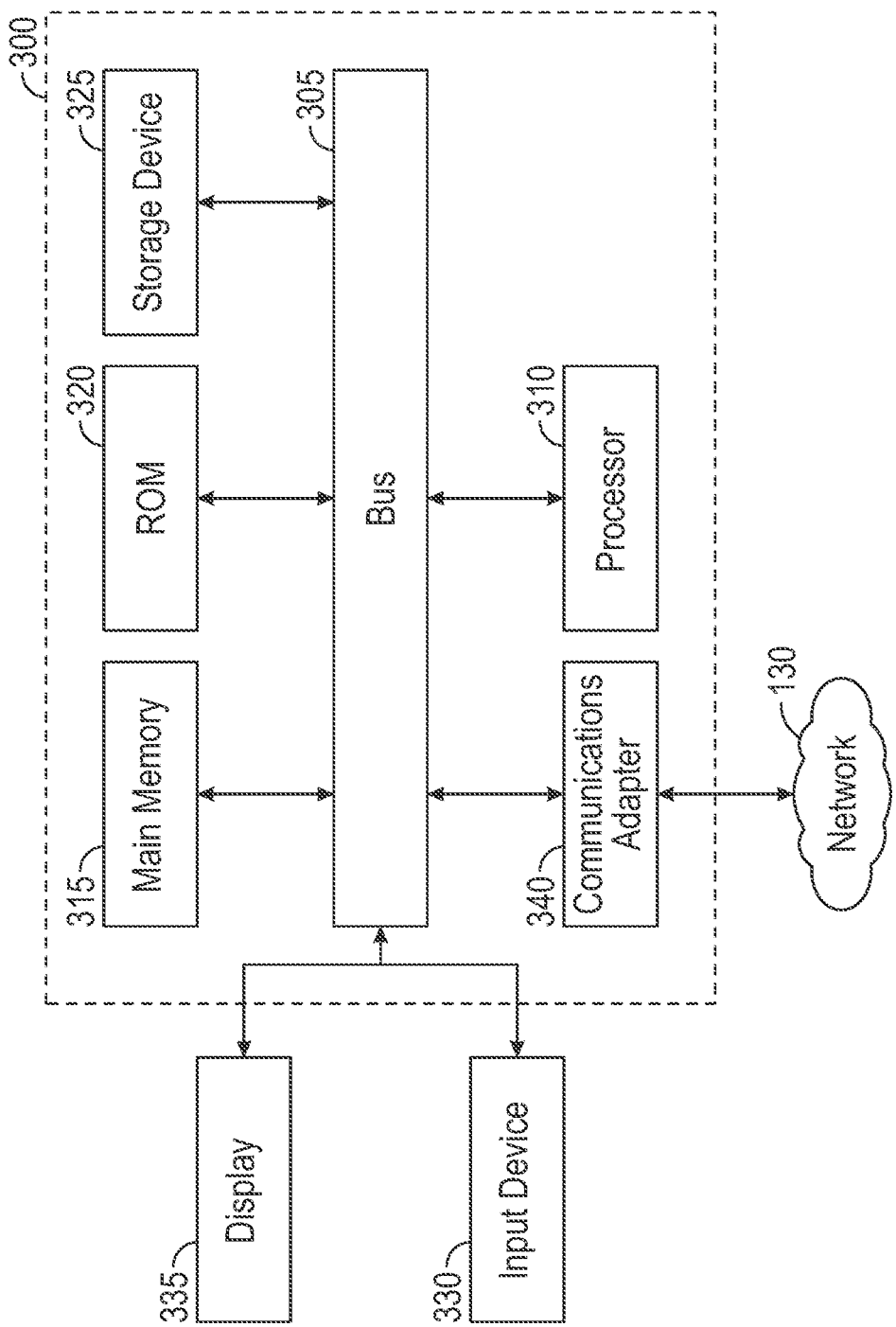
FIG. 3 is a block diagram illustrating an example computing system suitable for use in the various arrangements described herein, according to some embodiments.

FIG. 3 illustrates a depiction of a computer system 300 that can be used, for example, to implement an illustrative hydration system 110, an illustrative database 120, an illustrative user computing system 140, illustrative data sources 150, and/or various other illustrative systems described in the present disclosure. The computing system 300 includes a bus 305 or other communication component for communicating information and a processor 310 coupled to the bus 305 for processing information. The computing system 300 also includes main memory 315, such as a random-access memory (RAM) or other dynamic storage device, coupled to the bus 305 for storing information, and instructions to be executed by the processor 310. Main memory 315 can also be used for storing position information, temporary variables, or other intermediate information during execution of instructions by the processor 310. The computing system 300 can further include a read only memory (ROM) 320 or other static storage device coupled to the bus 305 for storing static information and instructions for the processor 310. A storage device 325, such as a solid-state device, magnetic disk or optical disk, is coupled to the bus 305 for persistently storing information and instructions.

The computing system 300 can be coupled via the bus 305 to a display 335, such as a liquid crystal display, or active matrix display, for displaying information to a user. An input device 330, such as a keyboard including alphanumeric and other keys, can be coupled to the bus 305 for communicating information, and command selections to the processor 310. In some embodiments, the input device 330 has a touch screen display 335. The input device 330 can include a cursor control, such as a mouse, a trackball, or cursor direction keys, for communicating direction information and command selections to the processor 310 and for controlling cursor movement on the display 335.

In some embodiments, the computing system 300 can include a communications adapter 340, such as a networking adapter. Communications adapter 340 can be coupled to bus 305 and can allow communications with a computing or communications network 130 and/or other computing systems. In some embodiments, any type of networking configuration can be achieved using communications adapter 340, such as wired (e.g., via Ethernet), wireless (e.g., via Wi-Fi, Bluetooth, etc.), pre-configured, ad-hoc, LAN, WAN, etc.

In some embodiments, the processes that effectuate illustrative implementations that are described herein can be achieved by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement can also be employed to execute the instructions contained in main memory 315. In some embodiments, hard-wired circuitry can be used in place of or in combination with software instructions to implement illustrative implementations. Thus, implementations are not limited to any specific combination of hardware circuitry and software.

Although an example processing system has been described in FIG. 3, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Figure 4A:
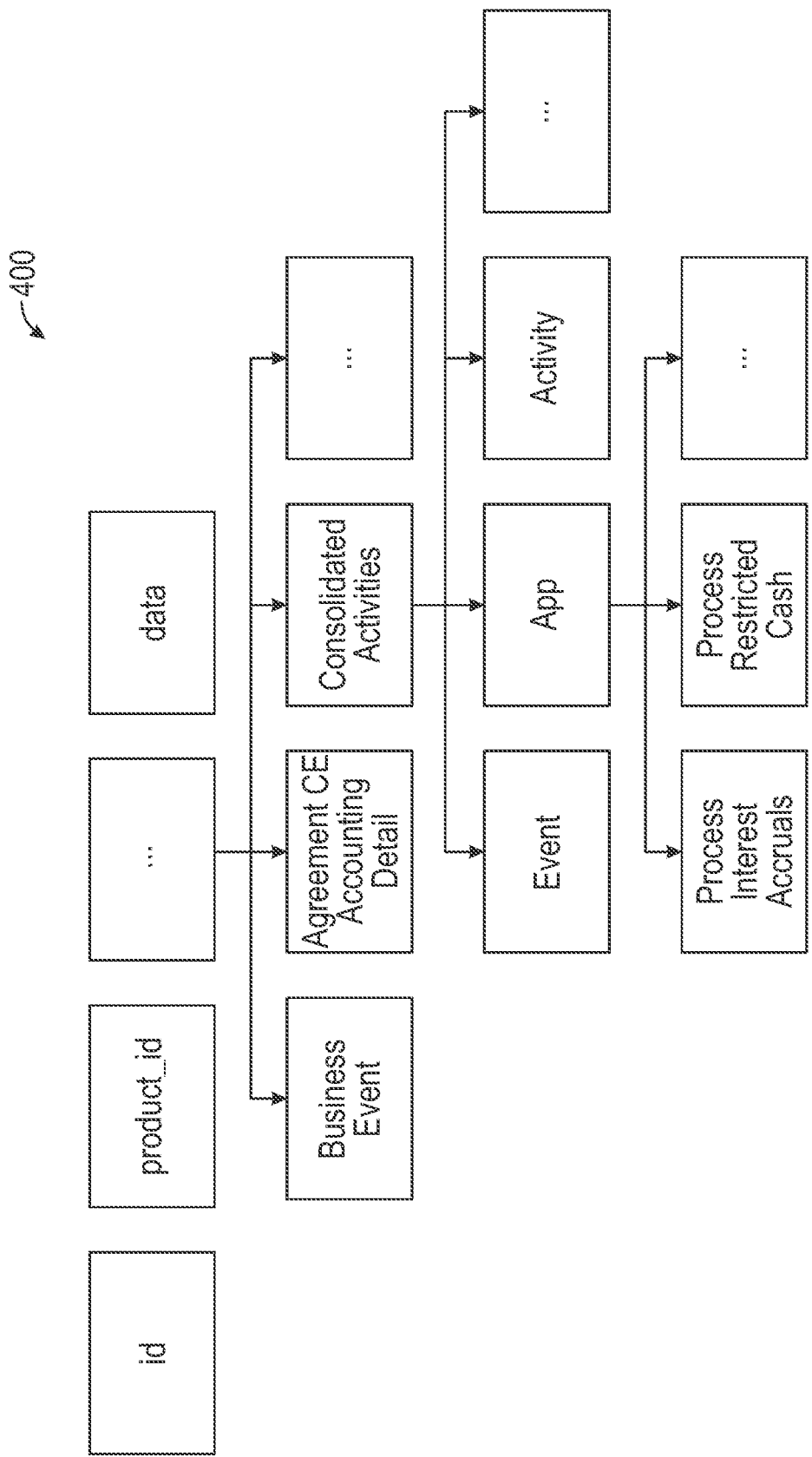
FIGS. 4A and 4B are illustrative examples of unstructured data before and after the unstructured data is normalized, according to some embodiments.
Figure 4B:
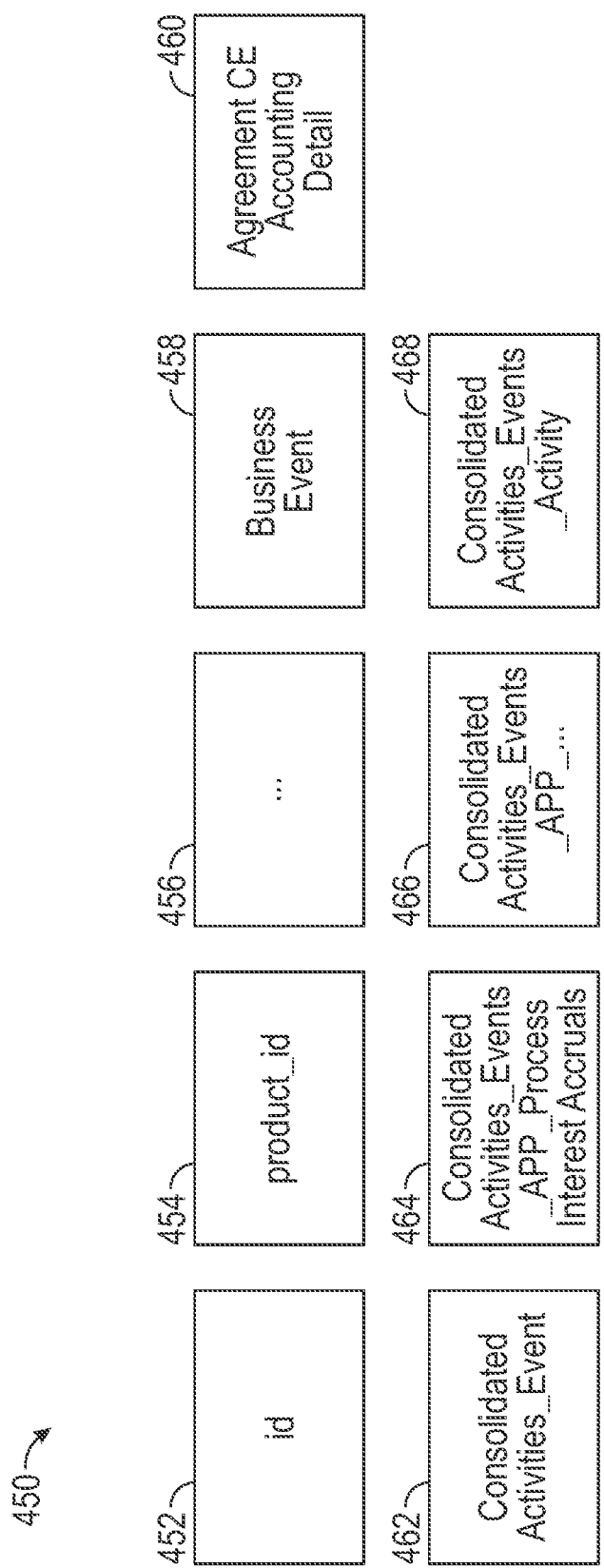

Referring now to FIGS. 4A and 4B, illustrative examples of unstructured data 400 and 450 before and after the unstructured data 400 and 450 is normalized are shown, according to some embodiments. As shown in FIG. 4A, the unstructured data 400 can be in a format (or schema) such as a linked list or tree (e.g., including multiple objects with nested lists of sub-objects, nodes with branches, fields with subfields, etc.). For example, the unstructured data 400 can include a plurality of fields (e.g., "id," "product_id," etc.) which can include a plurality of subfields (e.g., "Business Event," "Consolidated Activities," etc.), which can further include subfields (e.g., "Event," "App," etc.), and so on.

As shown in FIG. 4A, the unstructured data 400 can be deficient in having a predefined format (e.g., not organized into columns/rows, mislabeled data, missing entries, incomplete) or otherwise diverge from a predefined schema associated with a database or data source (e.g., database 120 of FIG. 1). As shown in FIG. 4B, the unstructured data 450 can be normalized (e.g., transformed, flattened, etc.) using various data normalization and transformation techniques, as described regarding FIGS. 1-2. In some embodiments, the unstructured data 540 can be flattened or transformed from a hierarchical structure (e.g., having fields and subfields) into a single-level structure. For example, the unstructured data 450 can be transformed to include fields 452-468 corresponding to subfields of the unstructured data 400 of FIG. 4A in a single-level structure, such as id 452, product_id 545, business event 458, etc. For example, rather than including a "business event" field as a subfield in a data hierarchy (e.g., as shown in the unstructured data of FIG. 4A), the business event 458 can be included within unstructured data 450 as flattened or normalized data entry. The unstructured data 450 can be further utilized for maintaining data integrity of a database as further described herein.

Figure 5:
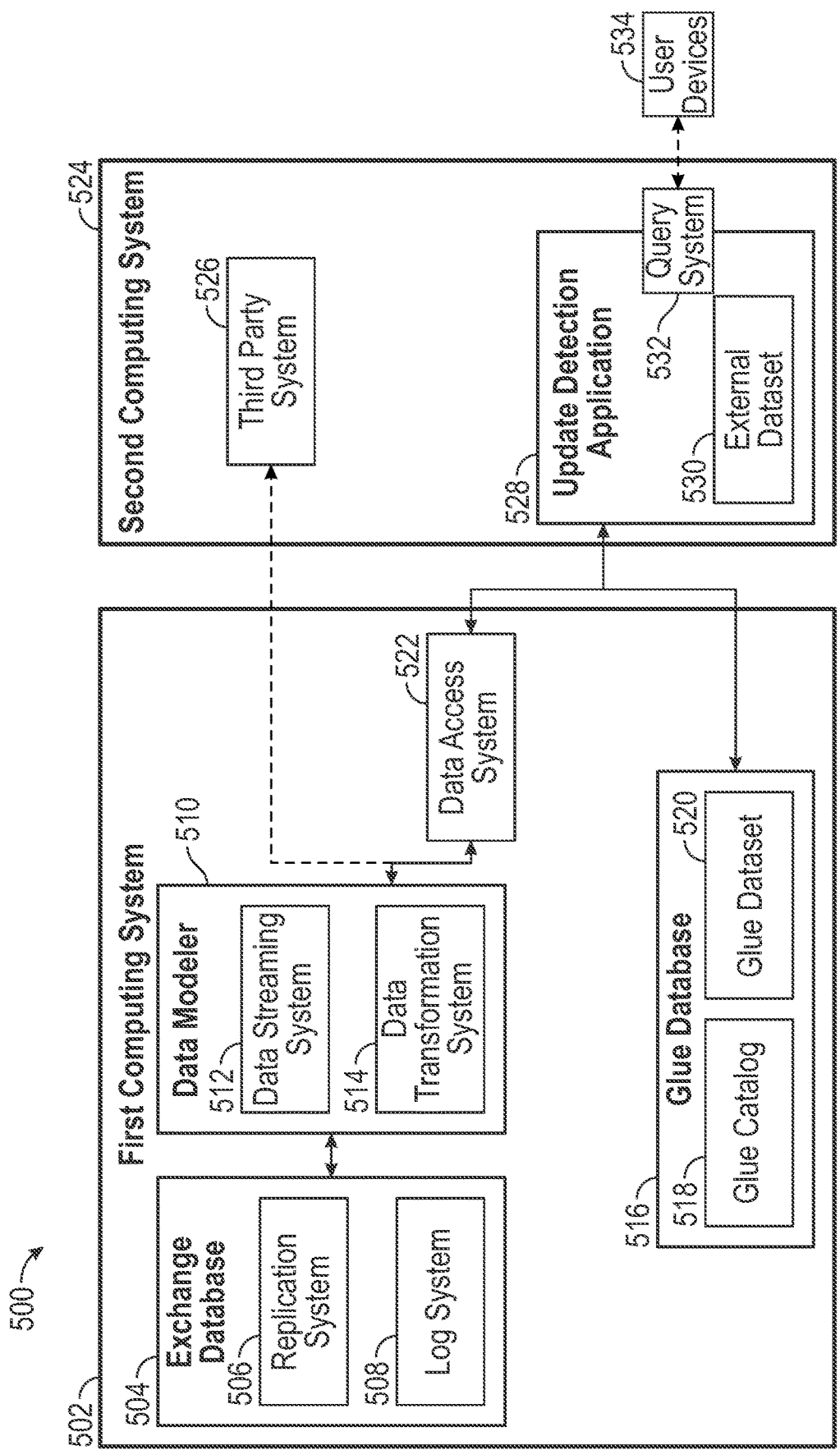
FIG. 5 is a block diagram depicting an implementation of a system for maintaining data integrity incorporating various features and functionality of the systems of FIG. 1, according to some embodiments.

FIG. 5 is a block diagram depicting an implementation of a system for maintaining data integrity, according to some embodiments. As shown in FIG. 5, a computing environment 500 can include a first computing system 502, which can include an exchange database 504. The exchange database 504 can include a replication system 506 and a log system 508. In some embodiments, the first computing system 502 can include a data modeler 510. The data modeler 510 can include a data streaming system 512 and a data transformation system 514. In some embodiments, the first computing system 502 can include a glue database 516, and the glue database 516 can include a glue catalog 518 and a glue dataset 520. The first computing system can further include a data access system 522. In some embodiments, the computing environment 500 can further include a second computing system 524. The second computing system 524 can include a third party system 526 and an update detection application 528. In some embodiments, the update detection application 528 can include an external dataset 530 and a query system 532. The computing environment 500 can further include one or more user devices 534.

In some embodiments, the first computing system 502 can include similar features and functionalities as described in detail regarding the hydration system 110 of FIG. 1 and/or can include various components of the computing environment 100 as described regarding FIG. 1. For example, the exchange database 504 of the first computing system can be the database 120 and/or include analysis dataset 122 and can detect changes associated with input/source data (e.g., unstructured data). In some embodiments, the replication system 506 of the exchange database 504 can be implemented by the database 120 and/or data source 150 and can replicate another database, data associated with the other database, changes/modifications/deletions to the data, and more. In some embodiments, the log system 508 of the exchange database 504 can be implemented by the database 120 and/or data source 150 and can log or store changes (e.g., changes, modifications, transformations) to data included in database 120, data sources 150, or other databases/data sources. For example, the log system 508 can be a shadow or monitored database and can store data associated with unstructured data being added to a database (e.g., metadata, timestamps, etc.) and/or unstructured data being updated or transformed to a structured format (e.g., versioning history, etc.). The exchange database 504 can be operably connected to the data modeler 510, and the exchange database 504 and data modeler 510 can communicate via a network (e.g., network 130).

In some embodiments, the data modeler 510 of the first computing system 502 can include similar features and functionalities as described in detail regarding the hydration system 110 and/or one or more of the systems implemented by hydration system 110 (e.g., change detection system 112, schema comparison system 114, in-flight transformation system 116, etc.). In some embodiments, the data streaming system 512 and/or the data transformation system 514 of the data modeler 510 can implement the in-flight transformation system 116 to stream data and/or transform the data to align with a schema (e.g., a predetermined schema of a target database, such as database 120). The data modeler 510 can be operably connected to the data access system 522 and/or the third party system 526 (e.g., to enable communication via a network, such as network 130).

The first computing system 502 can also include the glue database 516, and the glue database 516 can be a database (e.g., database 120) configured to store and manage data having diverse data formats (e.g., divergent schemas, diverse data types, etc.). In some embodiments, the glue catalog 518 can be a repository (e.g., containing data, metadata, etc.) that manages and/or organizes data across multiple data storage systems. For example, the glue catalog 518 can be a set of categories and rules of data of the data sources 150 and/or database 120 (e.g., including analysis dataset 122 and/or query dataset 124). The glue dataset 520 can be any data source, database, or dataset described in FIG. 1 (e.g., analysis dataset 122, query dataset 124, etc.). In some embodiments, the glue dataset 520 can include a searchable (e.g., configured to execute in response to a query of a user, etc.) dataset optimized to store and manage data of diverse schemas (e.g., structured data, semi-structured data, unstructured data, etc.). The glue database 516 can be operably connected to the data access system 522 and/or the update detection application 528 (e.g., via the network 130).

The data access system 522 can implement similar features and functionality as the hydration system 110 of FIG. 1. For example, the data access system 522 can access data from the glue database 516 (e.g., data stored on glue catalog 518 and/or glue dataset 520) and/or data from the update detection application 528 (e.g., data returned via query system 532 and/or data of the external data set 530). In some embodiments, the data access system can be operably connected to the third party system 526 to allow communication between the data modeler 510, data access system 522, third party system 526, and update detection application 522, as well as other components of the computing environment 500 (e.g., exchange database 504, user devices 534, etc.).

In some embodiments, the third party system 526 of the second computing system 524 can include similar features or functionalities as described in detail regarding the user computing devices 140 (e.g., third party computing device 140 and/or provider computing device 140). For example, the third party system 526 can be a computing device configured to allow a third party (or user, provider, etc.) to initiate one or more functionalities associated with the components of the computing environment 500 (e.g., first computing system 502, data modeler 510, query system 532, etc.). For example, the third party system 526 can query the query system 534 to provide information related to a change (e.g., modification, insertion, update, deletion, etc.) of stored data (e.g., structured and/or unstructured data included in glue dataset 520 of glue database 516, etc.).

In some embodiments, the update detection application 528 of the second computing system 524 can include similar features or functionalities as described in detail regarding the change detection system 112 of the hydration system 110. For example, the update detection application 528 can determine whether data stored in one or more of the elements of the computing environment 500 (e.g., glue database 516) has been changed (e.g., modified, updated, inserted, deleted, etc.) by executing a change detection function (e.g., log-based CDC function, etc.), or otherwise. For example, in response to determining that data has been updated/changed/modified, the update detection application 528 can communicate data associated with the update, modification, or deletion to the glue dataset 520, the data modeler 510, the data access system 522, and various other components of the computing environment 500. In some embodiments, the communications described above can be executed via the data access system 522. For example, the data access system 522 can communicate or transmit information transmitted by the update detection application 528 to the various other components of the computing environment 500.

Further, the update detection application 528 can include the external dataset 530 and the query system 532. In some embodiments, the external dataset 530 can include similar features and functionality as described in detail regarding the data source 150 of FIG. 1. For example, data stored by the external dataset 530 can be data originating outside of the computing environment 500 or outside of the first computing system 502. For example, the external dataset 530 can include data or datasets from third party systems and/or provider systems (e.g., via the third party system 526 and/or user devices 534). In some embodiments, the query system 532 can be a system configured to receive, manage, and respond to queries initiated by the user devices 534

In some embodiments, the user devices 534 of the computing environment 500 can include similar features and functionalities as described in detail regarding the third party system 526 of the second computing system 524. For example, the user devices 534 can be computing devices configured to allow a third party (or user, provider, client, etc.) to initiate one or more functionalities associated with the components of the computing environment 500 (e.g., first computing system 502, data modeler 510, query system 532, etc.). For example, the user devices 534 can query the query system 534 to provide information related to a change (e.g., modification, insertion, update, deletion, etc.) of stored data (e.g., structured and/or unstructured data included in glue dataset 520, etc.). In some embodiments, the user devices 534 can include databases or data sources (e.g., glue database 516, external dataset 530, a database or dataset included in the third party system 526, etc.), and one or more of the components of the computing environment 500 (e.g., data modeler 510) can execute various functions on data stored within user devices 534, as further described herein.

In some embodiments, a query (or request) can be initiated via user devices 534 and communicated to the query system 532, and the query system 532 can transmit information associated with the query to the update detection application 528. In response, the update detection application 528 can determine a change, modification, update, and likewise of data related to the request initiated via user devices 534. In some embodiments, the update detection application 528 can periodically (or repeatedly, or according to a prespecified time, etc.) determine whether there has been an update, deletion, or insertion of data (e.g., in a target data store such as glue database) without being prompted by a user request/query from user devices 534. For example, the update detection system 528 can utilize the external dataset 530 to determine whether data has been updated, modified, deleted, inserted, or otherwise changed from an initial state. For example, the update detection system 528 can compare data of the external dataset 530 with other data, such as data stored on the glue dataset 520 and/or the exchange database 504. For example, the update detection system 528 can analyze the replication system 506 and/or the log system 508 to determine whether changes have been made to stored data. Further, in response to the update detection application 528 determining an update, insertion, or deletion of data (e.g., unstructured data) in a database, the update detection application 528 can communicate with the various elements of the computing environment 500 (e.g., glue database 516 and/or the data access system 520) to perform various functionalities as further described herein.

In some embodiments, the data access system 522 can access information related to the results of a CDC analysis (e.g., change identified, no change, etc.) performed by the update detection application 528. For example, the data access system 522 can transmit the information related to the results of the CDC analysis to the data modeler 510, which can include data (e.g., unstructured data, input data) related to a captured change and/or modification (e.g., database items or fields, timestamps, metadata, etc.). In some embodiments, the data modeler 510 can perform various operations on the transmitted data using various subsystems (data streaming system 512, data transformation system 514, etc.). For example, the data transformation system 514 can transform or update the input data in-flight as described regarding the in-flight transformation system 116 of FIG. 1. For example, the data transformation system 514 can update data (e.g., unstructured data, data deficient in having a predefined schema, data having a schema divergent from a schema associated with the target data store, etc.) by normalizing the data using normalization methods, such as flattening input data having a hierarchal structure into data having a single-level (non-hierarchical) format/schema.

In some embodiments, responsive to receiving input data (e.g., unstructured data) via the data/access system 522, the data modeler 510 can utilize the data streaming system 512 and/or the data transformation system 514 to determine a schema of the input data. In some embodiments, the schema can be a schema that is distinct/diverges (e.g., columnar vs. tree, JSON vs. Parquet format, etc.) from a known schema (e.g., a schema utilized in a target data store of the input data (e.g., columnar vs. tree, JSON vs. Parquet format, etc.). Responsive to determining a divergence between the schema of the input data and the known (or predetermined) schema, the data streaming system 512 and/or data transformation system 514 can output a divergence result (e.g., match, partial match, etc.). In some embodiments, the data modeler 510 and/or data transformation system 514 can be configured to adjust input data (e.g., unmodified input data, flattened/normalized input data, etc.) to align with the predefined format/schema of the target store.

In some embodiments, after the input data has been transformed (e.g., as flattened data, structured data, etc.), various components of the computing environment 500 can store the input data in various databases/data stores (e.g., glue database 516). For example, via communications facilitated by the data access system 522, the transformed data can be stored in exchange database 504, glue database 516, external dataset 530, and/or in a database included in the storage/memory of the third party system 526. In storing the data, the various components of the computing environment 500 can be configured to execute data deduplication functions (e.g., cleaning functions, versioning functions) to avoid including duplicate entries in the target database (e.g., each data entry being a distinct data entry within the database, such that the specific information included in a data entry is distinct from other information included in the additional data entries of the database (e.g., glue database 516). Thus, the system can effectively integrate diverse data types and maintain data integrity amongst the various computing devices and systems of the computing environment 500.

Figure 6:
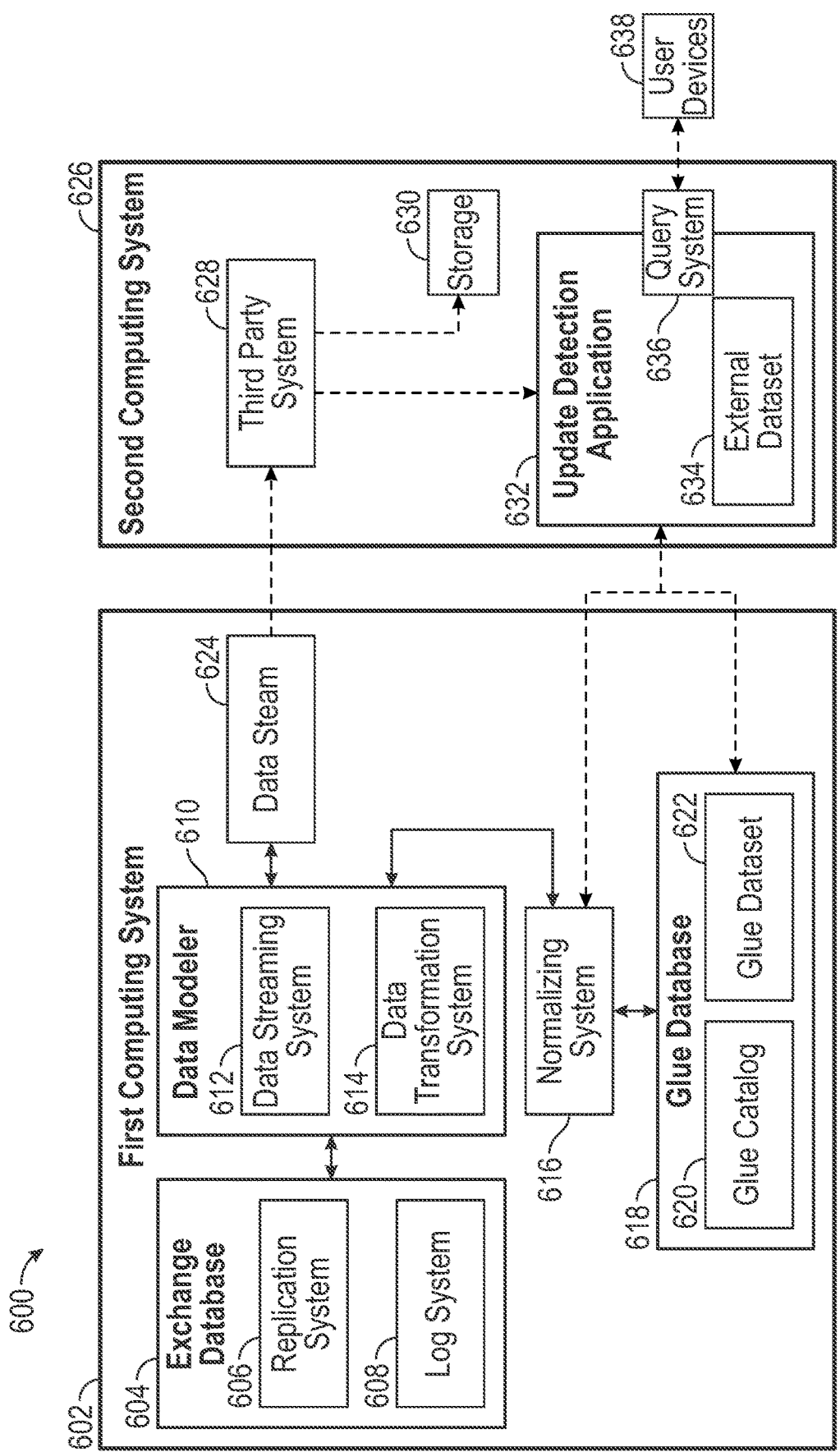
FIG. 6 is a block diagram depicting an implementation of a system for maintaining data integrity incorporating various features and functionality of the systems of FIG. 1, according to some embodiments.

FIG. 6 is a block diagram depicting an implementation of a system for maintaining data integrity, according to some embodiments. As shown in FIG. 6, a computing environment 600 can include a first computing system 602 (e.g., hydration system 110 of FIG. 1), which can include an exchange database 604. The exchange database 604 can include a replication system 606 and a log system 608. In some embodiments, the first computing system 602 can include a data modeler 610. The data modeler 610 can include a data streaming system 612 and a data transformation system 614. In some embodiments, the first computing system 602 can include a normalizing system 616. In some embodiments, the first computing system 602 can include a glue database 618, and the glue database 616 can include a glue catalog 620 and a glue dataset 622. The first computing system can further include a data stream 624. In some embodiments, the computing environment 600 can further include a second computing system 626. The second computing system 626 can include a third party system 628, storage 630, and an update detection application 632. In some embodiments, the update detection application 632 can include an external dataset 634 and a query system 636. The computing environment 600 can further include one or more user devices 638.

In some embodiments, the various computing systems, databases, and other elements of the computing environment 600 can include similar features and functionality as described in detail regarding the elements of the computing environment 500. For example, the various components of FIG. 6 (e.g., first computing system 602, exchange database 604, replication system 606, log system 608, data modeler 610, data streaming system 612, data transformation system 614, glue database 618, glue catalog 620, glue dataset 622, second computing system 626, third party system 628, update detection application 632, external dataset 634, query system 636, and/or user devices 638), respectively, can include similar features and functionality as described in detail regarding the various components of FIG. 5 (e.g., first computing system 502, exchange database 504, replication system 506, log system 508, data modeler 510, data streaming system 512, data transformation system 514, glue database 516, glue catalog 518, glue dataset 520, second computing system 524, third party system 526, update detection application 528, external dataset 530, query system 532, and/or user devices 534). In some embodiments, the first computing system 602 can also include a normalizing system 616. For example, the normalizing system 616 can include similar features/functionality as described in detail regarding the hydration system 110 (e.g., schema comparison system 114, in flight-transformation system 116, etc.). The first computing system 600 can also include a data stream 624, which can include similar features and functionality as described regarding the data access system 522 of FIG. 5. The third party system 628 can also include storage 630 (e.g., database, non-transitory memory, etc.). For example, the storage 630 can be used to store data associated with an update, insertion, or deletion of unstructured data, as described in detail above.

In some embodiments, a query (or request) can be initiated via user devices 638 and communicated to the query system 636, and the query system 636 can transmit information related to the query to the update detection application 632, as described regarding FIG. 5. In response, the update detection application 632 can determine a change, modification, update, and likewise of data related to the request or, if no request is made, the update detection application 632 can periodically (or repeatedly, or according to a prespecified time, etc.) determine whether there has been an update, deletion, or insertion of data (e.g., in a target data store such as glue database) without being prompted by a user request/query from user devices 632, as described regarding FIG. 5.

In some embodiments, the data stream 624 can access information related to the results of a CDC analysis (e.g., change identified, no change, etc.) performed by the update detection application 632 and transmit this data to one or more elements of the computing environment (e.g., between the data stream 624 and the data modeler 610, third party system 628, etc.). In some embodiments, the data modeler 610 can perform various operations on the transmitted data using various subsystems as described regarding FIG. 5. For example, the data transformation system 614 can transform or update the input data in-flight as described regarding the in-flight transformation system 116 of FIG. 1. For example, the data transformation system 614 can update data (e.g., unstructured data, data deficient in having a predefined schema, data having a schema divergent from a schema associated with the target data store, etc.) by normalizing the data using normalization methods, such as flattening input data having a hierarchal structure into data having a single-level (non-hierarchical) format/schema.

In some embodiments, responsive to receiving input data (e.g., unstructured data) via the data stream 624, the data modeler 610 can determine a schema of the input data, as described regarding FIG. 5. In some embodiments, the schema can be a schema that is distinct/diverges (e.g., columnar vs. tree, JSON vs. Parquet format, etc.) from a known schema (e.g., a schema utilized in a target data store of the input data (e.g., columnar vs. tree, JSON vs. Parquet format, etc.). Responsive to determining a divergence between the schema of the input data and the known (or predetermined) schema, the data stream 624 and/or data transformation system 614 can output a divergence result (e.g., match, partial match, etc.). In some embodiments, the data modeler 610 and/or data transformation system 614 can be configured to adjust input data (e.g., unmodified input data, flattened/normalized input data, etc.) to align with the predefined format/schema of the target store, as described regarding FIG. 5.

Figure 7:
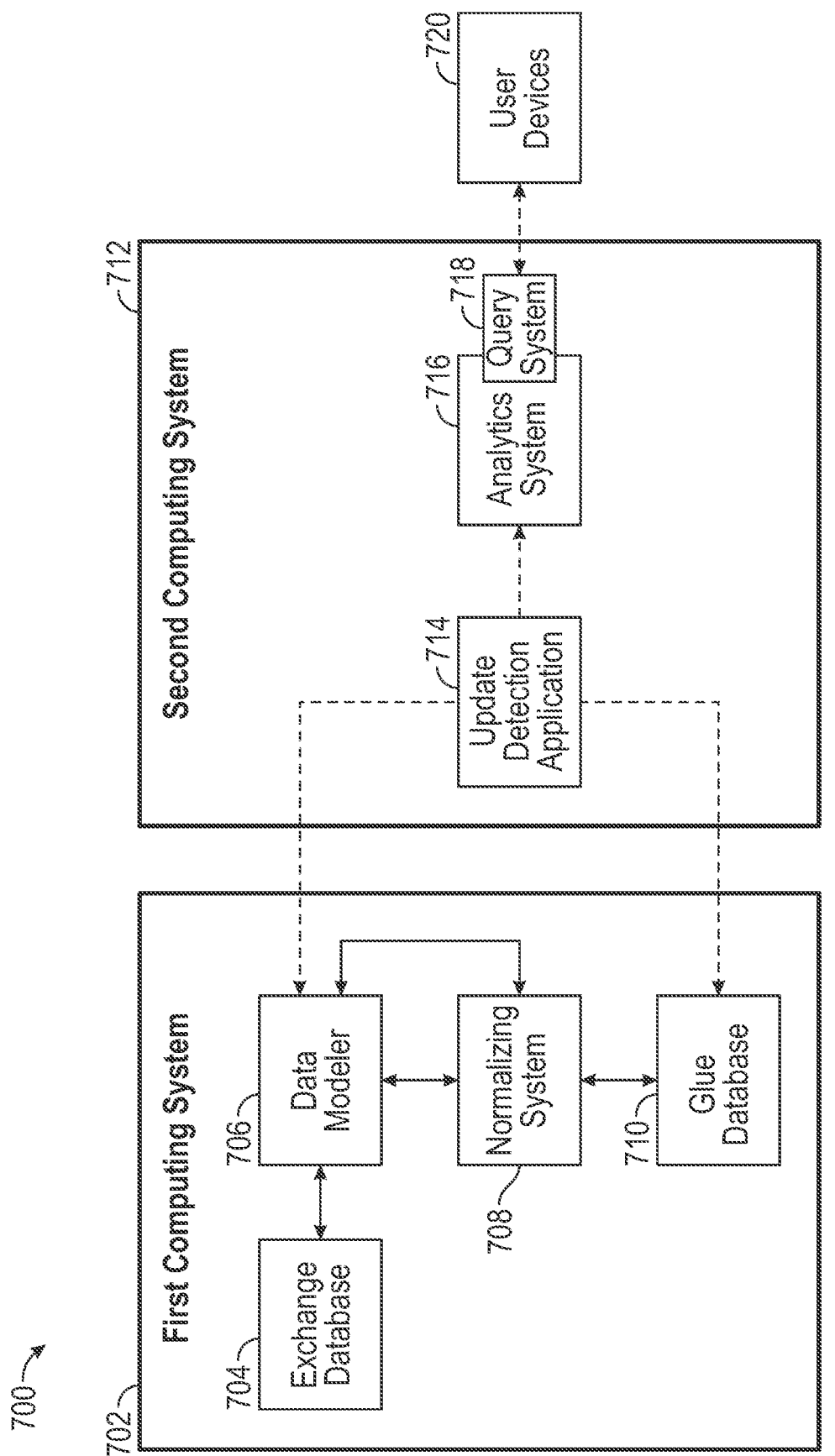
FIG. 7 is a block diagram depicting an implementation of a system for maintaining data integrity incorporating various features and functionality of the systems of FIG. 1, according to some embodiments.

In some embodiments, after the input data has been transformed (e.g., as flattened data, structured data, etc.), various components of the computing environment 600 can store the input data in various databases/data stores (e.g., glue database 618). For example, via communications facilitated by the data stream 624, the transformed data can be stored in various databases and datasets (e.g., exchange database 604, glue database 616) as described in detail regarding FIG. 5. In storing the data, the various components of the computing environment 600 (e.g., first computing system 602) can be configured to execute data deduplication functions to avoid including duplicate entries in the target database FIG. 7 is a block diagram depicting an implementation of a system for maintaining data integrity, according to some embodiments. As shown in FIG. 7, a computing environment 700 can include a first computing system 702 (e.g., hydration system 110 of FIG. 1), which can include an exchange database 704. The first computing system 702 can also include a data modeler 706, a normalizing system 708, and a glue database 710. In some embodiments, the computing environment 700 can also include a second computing system 712. The second computing system 712 can include an update detection application 714 and an analytics system 716. In some embodiments, the analytics system 716 can include a query system 718. The computing environment 700 can also include one or more user devices 720.

In some embodiments, the various computing systems, databases, and other elements of the computing environment 700 can include similar features and functionality as described in detail regarding the elements of the computing environment 500 of FIG. 5 and/or computing environment 600 of FIG. 6. For example, the various components of FIG. 7 (e.g., first computing system 702, exchange database 704, data modeler 706, glue database 710, second computing system 712, update detection application 714, query system 718, and/or user devices 720), respectively, can include similar features and functionality as described in detail regarding the various components of FIG. 5 and/or FIG. 6 (e.g., first computing system 502, exchange database 504, normalizing system 616, data modeler 510, glue database 516, second computing system 626, query system 532, and/or user devices 524). In some embodiments, the second computing system 712 can also include an analytics system 716. For example, the analytics system 716 can include similar features/functionality as described in detail regarding the hydration system 110 (e.g., schema comparison system 114, in flight-transformation system 116, etc.). In some embodiments, the analytics system 716 can be configured to execute data analytics functions on data stored in one or more elements of the computing environment 700 (e.g., on data stored in glue database 714).

In some embodiments, a query (or request) can be initiated via user devices 720 and communicated to the query system 718, and the query system 718 can transmit information related to the query to the update detection application 714, as described regarding FIGS. 5-6. In response, the update detection application 714 can determine a change, modification, update, and likewise of data related to the request or, if no request is made, the update detection application 714 can periodically (or repeatedly, or according to a prespecified time, etc.) determine whether there has been an update, deletion, or insertion of data (e.g., in a target data store such as glue database), as described regarding FIGS. 5-6.

In some embodiments, the update detection application 714 can transmit this data output to one or more elements of the computing environment (e.g., between the update detection application 714 and the data modeler 706, normalizing system 708, glue database 710, and/or query system 718). In some embodiments, the data modeler 710 can perform various operations on the transmitted data using various subsystems as described regarding FIGS. 5-6. For example, the data transformation system data modeler 706 can transform or update the input data from the user devices 720 (e.g., unstructured data, data deficient in having a predefined schema, data having a schema divergent from a schema associated with the target data store, etc.) in-flight by normalizing the data using normalization methods, such as flattening input data having a hierarchal structure into data having a single-level (non-hierarchical) structure. In other embodiments, the normalization system 708 can include similar features and functionality as described in detail regarding the data modeler 710.

In some embodiments, responsive to receiving input data (e.g., unstructured data), the data modeler 706 can determine a schema of the input data, as described regarding FIGS. 5-6. In some embodiments, the schema can be a schema that is distinct/diverges from a known schema. Responsive to determining a divergence between the schema of the input data and the known (or predetermined) schema, the data modeler 706 can output a divergence result (e.g., match, partial match, etc.). In some embodiments, data normalization system 708 can be configured to adjust input data (e.g., unmodified input data, flattened/normalized input data, etc.) to align with the predefined format/schema of the target store, as described regarding FIGS. 5-6.

In some embodiments, after the input data has been transformed (e.g., as flattened data, structured data, etc.), various components of the computing environment 700 can store the input data in various databases/data stores (e.g., glue database 710). For example, via communications facilitated by the update detection application 714, the transformed data can be stored in various databases and datasets (e.g., exchange database 704, glue database 710) as described in detail regarding FIGS. 5-6. In storing the data, the various components of the computing environment 700 (e.g., data modeler 706, normalizing system 708, glue database 710, etc.) can be configured to execute data deduplication functions to avoid including duplicate entries in the target database, as described in detail regarding FIGS. 5-6.

Although an example processing system has been described in FIG. 1, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks, distributed ledger networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for maintaining data integrity, comprising:
monitoring, by one or more processing circuits, an upstream source using changed data capture (CDC), wherein the CDC identifies an update, insertion, or deletion of unstructured data stored in the upstream source;
determining, by the one or more processing circuits, a new schema of the unstructured data using a function identified based on a correspondence between the unstructured data and a previous schema, the function comprising at least one of an inferring function or a predefined transformation function, wherein determining the new schema comprises performing the function using at least one of pattern recognition or the previous schema;
determining, by the one or more processing circuits, a divergence between the new schema and the previous schema of the unstructured data based on comparing the new schema to the previous schema of the unstructured data;
generating, by the one or more processing circuits, structured data comprising one or more pointers to the unstructured data, wherein generating the structured data comprises normalizing the unstructured data during in-flight transmission of the unstructured data to a database, the structured data is generated based on performing an in-flight transformation before storing the structured data in the database, wherein the in-flight transformation causes the one or more processing circuits to apply the new schema to the unstructured data to generate the structured data; and
storing, by the one or more processing circuits, the structured data in the database, wherein the database comprises an established data channel between the database and a downstream source, and wherein the structured data is a unique representation within the database of the update, insertion, or deletion of the unstructured data.

2. The method according to claim 1, further comprising:
recognizing, by the one or more processing circuits, that the unstructured data corresponds to the previous schema; and
in response to recognizing that the unstructured data corresponds to the previous schema, executing, by the one or more processing circuits, the predefined transformation function corresponding to the previous schema or initiating, by the one or more processing circuits, a schema inference process.

3. The method according to claim 1, wherein the unstructured data comprises information in a natural language format, and wherein determining the new schema further comprises:
transforming, by the one or more processing circuits, the unstructured data into a single-layer structure;
identifying, by the one or more processing circuits, one or more fields of the unstructured data by executing the pattern recognition;
classifying, by the one or more processing circuits, the identified fields; and
establishing, by the one or more processing circuits, one or more relationships between the identified classified fields.

4. The method according to claim 1, further comprising:
initializing, by the one or more processing circuits, the database;

loading, by the one or more processing circuits, seed data from the upstream source, wherein the seed data comprises reference data for the initialization of the database or test data for evaluating functionality of the database; and storing, by the one or more processing circuits, data corresponding to the seed data within the database.

5. The method according to claim 4, wherein identification of the update, insertion, or deletion of the unstructured data further comprises:

determining, by the one or more processing circuits, significance of the update, insertion, or deletion of the unstructured data;

capturing, by the one or more processing circuits and responsive to determining the significance, a record of the update, insertion, or deletion of the unstructured data; and storing, by the one or more processing circuits, the record in a transactional log of the database.

6. The method according to claim 1, wherein normalizing the unstructured data occurs in real-time or near real-time, wherein the update, insertion, or deletion of the unstructured data in the upstream source is represented as the structured data in the database in real-time or near real-time, and wherein the method comprises the new schema in real-time or near real-time, determining the divergence in real-time or near real-time, and and generating the structured data in real-time or near real-time.

7. The method according to claim 1, further comprising:

analyzing, by the one or more processing circuits, metadata corresponding to the unstructured data;

determining, by the one or more processing circuits, that the metadata corresponding to the unstructured data is unique within the database to prevent duplicate data entries; and storing, by the one or more processing circuits, the metadata corresponding to the unstructured data within the database.

8. The method according to claim 1, wherein determining the new schema comprises using an artificial intelligence (AI) algorithm, and wherein the AI algorithm determines the divergence between the new schema and the previous schema or compares the new schema to the previous schema.

9. A system for maintaining data integrity, comprising:

a data processing system comprising memory and one or more processing circuits configured to:

monitor an upstream source using changed data capture (CDC), wherein the CDC identifies an update, insertion, or deletion of unstructured data stored in the upstream source;

determine a new schema of the unstructured data using a function identified based on a correspondence between the unstructured data and a previous schema, the function comprising at least one of an inferring function or a predefined transformation function, wherein determining the new schema comprises performing the function using at least one of pattern recognition or the previous schema;

determine a divergence between the new schema and the previous schema of the unstructured data based on comparing the new schema to the previous schema of the unstructured data;

generate structured data comprising one or more pointers to the unstructured data, wherein generating the structured data comprises normalizing the unstructured data during in-flight transmission of the unstructured data to a database, the structured data is generated based on performing an in-flight transformation before storing the structured data in the database, wherein the in-flight transformation causes the one or more processing circuits to apply the new schema to the unstructured data to generate the structured data; and store the structured data in the database, wherein the database comprises an established data channel between the database and a downstream source, and wherein the structured data is a unique representation within the database of the update, insertion, or deletion of the unstructured data.

10. The system of claim 9, the one or more processing circuits further configured to:

recognize that the unstructured data corresponds to the previous schema; and in response to recognizing that the unstructured data corresponds to the previous schema, execute the predefined transformation function corresponding to the previous schema or initiate a schema inference process.

11. The system of claim 9, wherein the unstructured data comprises information in a natural language format, and the one or more processing circuits are further configured to:

transform the unstructured data into a single-layer structure;

identify one or more fields of the unstructured data by executing the pattern recognition;

classify the identified fields; and establish one or more relationships between the identified classified fields.

12. The system of claim 9, the one or more processing circuits further configured to:

initialize the database;

load seed data from the upstream source, wherein the seed data comprises reference data for the initialization of the database or test data for evaluating functionality of the database; and store data corresponding to the seed data within the database.

13. The system of claim 12, the one or more processing circuits further configured to:

determine significance of the update, insertion, or deletion of the unstructured data;

capture, responsive to determining the significance, a record of the update, insertion, or deletion of the unstructured data; and store the record in a transactional log of the database.

14. The system of claim 9, wherein normalizing the unstructured data occurs in real-time or near real-time, wherein the update, insertion, or deletion of the unstructured data in the upstream source is represented as the structured data in the database in real-time or near real-time, and the one or more processing circuits are further configured to determine the new schema in real-time or near real-time, determine the divergence in real-time or near real-time, and generate the structured data in real-time or near real-time.

15. The system of claim 9, the one or more processing circuits are further configured to:

analyze metadata corresponding to the unstructured data;

determine that the metadata corresponding to the unstructured data is unique within the database to prevent duplicate data entries; and store the metadata corresponding to the unstructured data within the database.

16. The system of claim 9, wherein determining the new schema comprises using an artificial intelligence (AI) algorithm, and wherein the AI algorithm determines the divergence between the new schema and the previous schema or compares the new schema to the previous schema.

17. One or more non-transitory computer-readable media (CRM) having instructions stored thereon that, when executed by at least one processing circuit, cause the at least one processing circuit to:
  monitor an upstream source using changed data capture (CDC), wherein the CDC identifies an update, insertion, or deletion of unstructured data stored in the upstream source;
  determine a new schema of the unstructured data using a function identified based on a correspondence between the unstructured data and a previous schema, the function comprising at least one of an inferring function or a predefined transformation function, wherein determining the new schema comprises performing the function using at least one of pattern recognition or the previous schema;
  determine a divergence between the new schema and the previous schema of the unstructured data based on comparing the new schema to the previous schema of the unstructured data;
  generate structured data comprising one or more pointers to the unstructured data, wherein generating the structured data comprises normalizing the unstructured data during in-flight transmission of the unstructured data to a database, the structured data is generated based on performing an in-flight transformation before storing the structured data in the database, wherein the in-flight transformation causes the one or more processing circuits to apply the new schema to the unstructured data to generate the structured data; and
  store the structured data in the database, wherein the database comprises an established data channel between the database and a downstream source, and wherein the structured data is a unique representation within the database of the update, insertion, or deletion of the unstructured data.

18. The one or more non-transitory CRM of claim 17, wherein the instructions cause the at least one processing circuit to:
  recognize that the unstructured data corresponds to the previous schema; and
  in response to recognizing that the unstructured data corresponds to the previous schema, execute the predefined transformation function corresponding to the previous schema or initiate a schema inference process.

19. The one or more non-transitory CRM of claim 17, wherein the unstructured data comprises information in a natural language format, and wherein the instructions cause the at least one processing circuit to:
  transform the unstructured data into a single-layer structure;
  identify one or more fields of the unstructured data by executing the pattern recognition;
  classify the identified fields; and
  establish one or more relationships between the identified classified fields.

20. The one or more non-transitory CRM of claim 17, wherein the instructions cause the at least one processing circuit to:
  initialize the database;
  load seed data from the upstream source, wherein the seed data comprises reference data for the initialization of the database or test data for evaluating functionality of the database; and
  store data corresponding to the seed data within the database.

* * * * *